United States Patent
Kim et al.

(10) Patent No.: US 10,825,009 B2
(45) Date of Patent: Nov. 3, 2020

(54) PAYMENT ADDITIONAL SERVICE INFORMATION PROCESSING METHOD AND ELECTRONIC DEVICE FOR SUPPORTING THE SAME

(71) Applicant: Samsung Electronics Co., Ltd., Suwon-si (KR)

(72) Inventors: In Ho Kim, Suwon-si (KR); Ji Su Oh, Yongin-si (KR); Seung Won Oh, Suwon-si (KR); Sung Hun Yu, Suwon-si (KR); Byoung Kab Choi, Seoul (KR); Ki Bong Kim, Daegu (KR); Seong Min Je, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

(21) Appl. No.: 15/070,704

(22) Filed: Mar. 15, 2016

(65) Prior Publication Data
US 2016/0275474 A1    Sep. 22, 2016

(30) Foreign Application Priority Data

Mar. 16, 2015 (KR) .................. 10-2015-0036265

(51) Int. Cl.
*G06Q 20/20*    (2012.01)
*G06Q 20/32*    (2012.01)
(Continued)

(52) U.S. Cl.
CPC ........... *G06Q 20/204* (2013.01); *G06Q 20/20* (2013.01); *G06Q 20/227* (2013.01); *G06Q 20/32* (2013.01);
(Continued)

(58) Field of Classification Search
CPC ...................................................... G06Q 20/20
(Continued)

(56) References Cited

U.S. PATENT DOCUMENTS 7,848,980 B2    12/2010  Carlson
8,447,647 B2     5/2013  Shin
(Continued)

FOREIGN PATENT DOCUMENTS

CN    104798092 A    7/2015
CN    104813349 A    7/2015
(Continued)

OTHER PUBLICATIONS

Chinese Office Action dated Dec. 25, 2018, issued in Chinese Application No. 201610146928.X.
(Continued)

*Primary Examiner* — Russell S Glass
(74) *Attorney, Agent, or Firm* — Jefferson IP Law, LLP

(57) ABSTRACT

An electronic device includes: a memory configured to store at least one instruction; and a processor connected to the memory. The at least one instruction executed by the processor is set to receive an application identifier for payment transaction from a reader device and generate payment related information including payment identification information for the payment transaction and additional service information relating to the payment transaction by a payment application corresponding to the application identifier.

19 Claims, 29 Drawing Sheets

(51) Int. Cl.
*G06Q 30/02* (2012.01)
*G06Q 20/22* (2012.01)

(52) U.S. Cl.
CPC ..... *G06Q 20/3223* (2013.01); *G06Q 20/3278* (2013.01); *G06Q 30/0207* (2013.01)

(58) Field of Classification Search
USPC .......................................................... 705/17
See application file for complete search history.

(56) References Cited

U.S. PATENT DOCUMENTS

| | | | |
|---|---|---|---|
| 8,458,017 | B2 | 6/2013 | Shin |
| 8,811,892 | B2 | 8/2014 | Khan et al. |
| 8,818,851 | B2 | 8/2014 | Lee et al. |
| 2004/0243519 | A1* | 12/2004 | Perttila ................ G06Q 20/425 705/75 |
| 2008/0154735 | A1 | 6/2008 | Carlson |
| 2008/0154772 | A1 | 6/2008 | Carlson |
| 2008/0167991 | A1 | 7/2008 | Carlson et al. |
| 2008/0201226 | A1 | 8/2008 | Carlson et al. |
| 2010/0010906 | A1* | 1/2010 | Grecia ................ G06Q 20/102 705/21 |
| 2010/0076832 | A1 | 3/2010 | Cha |
| 2011/0040686 | A1 | 2/2011 | Carlson |
| 2011/0078079 | A1 | 3/2011 | Shin |
| 2011/0244796 | A1 | 10/2011 | Khan et al. |
| 2012/0101885 | A1 | 4/2012 | Lee et al. |
| 2012/0130797 | A1 | 5/2012 | Shin |
| 2012/0197691 | A1 | 8/2012 | Grigg et al. |
| 2013/0054336 | A1 | 2/2013 | Graylin |
| 2013/0060701 | A1 | 3/2013 | Moon et al. |
| 2013/0325711 | A1* | 12/2013 | Geslin ................ G06Q 20/3278 705/41 |
| 2014/0025457 | A1 | 1/2014 | Martinez et al. |
| 2014/0052532 | A1 | 2/2014 | Tsai et al. |
| 2014/0052620 | A1 | 2/2014 | Rogers et al. |
| 2014/0052637 | A1 | 2/2014 | Jooste et al. |
| 2014/0058941 | A1 | 2/2014 | Moon et al. |
| 2014/0081720 | A1 | 3/2014 | Wu |
| 2014/0214664 | A1 | 7/2014 | Kim et al. |
| 2014/0249948 | A1 | 9/2014 | Graylin et al. |
| 2014/0258135 | A1 | 9/2014 | Park et al. |
| 2014/0316879 | A1 | 10/2014 | Lee et al. |
| 2015/0081540 | A1 | 3/2015 | Grigg et al. |
| 2015/0106218 | A1 | 4/2015 | Moon et al. |
| 2015/0142671 | A1 | 5/2015 | Dicker et al. |
| 2015/0339640 | A1 | 11/2015 | Kim et al. |
| 2016/0180313 | A1* | 6/2016 | Ekselius ............... G06Q 20/204 235/380 |

FOREIGN PATENT DOCUMENTS

| | | |
|---|---|---|
| CN | 105051768 A | 11/2015 |
| CN | 105723388 A | 6/2016 |
| EP | 2701107 A1 | 2/2014 |
| KR | 10-2008-0102439 A | 11/2008 |
| KR | 10-1330943 B1 | 11/2013 |
| KR | 10-2014-0095745 A | 8/2014 |
| WO | 2008/083105 A2 | 7/2008 |

OTHER PUBLICATIONS

Chinese Office Action dated Sep. 23, 2019, issued in Chinese Application No. 201610146928.X.

* cited by examiner

| B1 | B2 | B3 | B4 | B5 | B6 | B7 | B8 | B9 | B10 | B11 | B12 | B13 | B14 | B15 | B16 | B17 | B18 | B19 | B20 | B21 |
|----|----|----|----|----|----|----|----|----|----|----|----|----|----|----|----|----|----|----|----|----|
| BIN(6) ||||||  FIRST PRELIMINARY FIELD | CARD COMPOANY GENERATION ARBITRARY NUMBER |||||||||| PRELIMINARY CODE(4) |||| SECOND PRELIMINARY FIELD |
| APP CARD DEDICATED CARD NUMBER |||||||||||||||||| ALLIANCE SERVICE |||

FIG.7

| No | Name | LENGTH | CONTENT |
|---|---|---|---|
| 1 | BIN | 6 | NUMBER ALLOCATED TO CARD COMPANY |
| 2 | FIRST PRELIMINARY FIELD | 1 | SET TO "0" BY DEFAULT, BIN USE 7 DIGITS OR USED WHEN CARD COMPANY GENERATION AREA EXPAND |
| 3 | CARD COMPANY GENERATION ARBITRARY NUMBER | 9 | ARBITRARY NUMBER GENERATED BY CARD COMPANY |
| 4 | PRELIMINARY CODE | 4 | USED WHEN NECESSARY SUCH AS ALLIANCE SERVICE AND WHEN NOT USED |
| 5 | SECOND PRELIMINARY FIELD | 1 | SET TO "0" BY DEFAULT |
| | TOTAL | 21 | |

FIG.8

| Tag | Length | Value Description | | | |
|---|---|---|---|---|---|
| A1 | var | Payment Transaction Data Template | | | |
| | | Tag | Length | Value Description | |
| | | B1 | var | Payment information (OTC for App Card-Numeric string) | |
| | | C1 | var | Membership coupon service | |
| | | | | Tag | Length | Value Description |
| | | | | ... | | |
| | | C2 | var | Merchant stamp service | |
| | | | | Tag | Length | Value Description |
| | | | | ... | | |
| | | ... | | | |
| | | | | Tag | Length | Value Description |
| | | | | ... | | |

FIG.9

PAYMENT ADDITIONAL SERVICE INFORMATION PROCESSING METHOD AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Mar. 16, 2015 in the Korean Intellectual Property Office and assigned Serial number 10-2015-0036265, the entire disclosure of which is hereby incorporated by reference.

TECHNICAL FIELD

The present disclosure relates to payment additional service information processing.

BACKGROUND

Various purchase methods are provided during product purchasing processes. For example, consumers may make payment for products by using cashes or credit cards. Additionally, recently, techniques for paying for products by using financial information stored in a smartphone are under development.

Moreover, the processing of various additional service information in relation to product purchase may be required. For example, the processing of additional service information such as the processing of product purchase related membership points, the processing of purchase product related discounts or coupons, or advertisement processing may be required. During such a process, in order to process the additional service information, it is convenient for consumers to perform a repetitive mobile card operation.

SUMMARY

Accordingly, an aspect of the present disclosure is to provide a payment additional service information processing method for adaptively processing payment information and additional service information and an electronic device for supporting the same.

In accordance with an aspect of the present disclosure, an electronic device includes: a memory configured to store at least one instruction; and a processor connected to the memory, wherein the at least one instruction executed by the processor is set to receive an application identifier for payment transaction from a reader device and generate payment related information including payment identification information for the payment transaction and additional service information relating to the payment transaction by a payment application corresponding to the application identifier.

In accordance with an aspect of the present a disclosure, payment additional service information processing method includes: receiving, by an electronic device, an application identifier for payment transaction from a reader device; generating, by the electronic device, payment related information including payment identification information for the payment transaction and additional service information relating to the payment transaction by a payment application corresponding to the application identifier; and transmitting, by the electronic device, the payment related information to the reader device.

BRIEF DESCRIPTION OF THE DRAWINGS

FIG. 7 is a view illustrating one form of payment identification information according to an embodiment of the present disclosure.

FIG. 8 is a view illustrating a data value of payment identification information according to an embodiment of the present disclosure.

FIG. 9 is a view illustrating one form of additional service information according to an embodiment of the present disclosure.

DETAILED DESCRIPTION

Figure 1A:
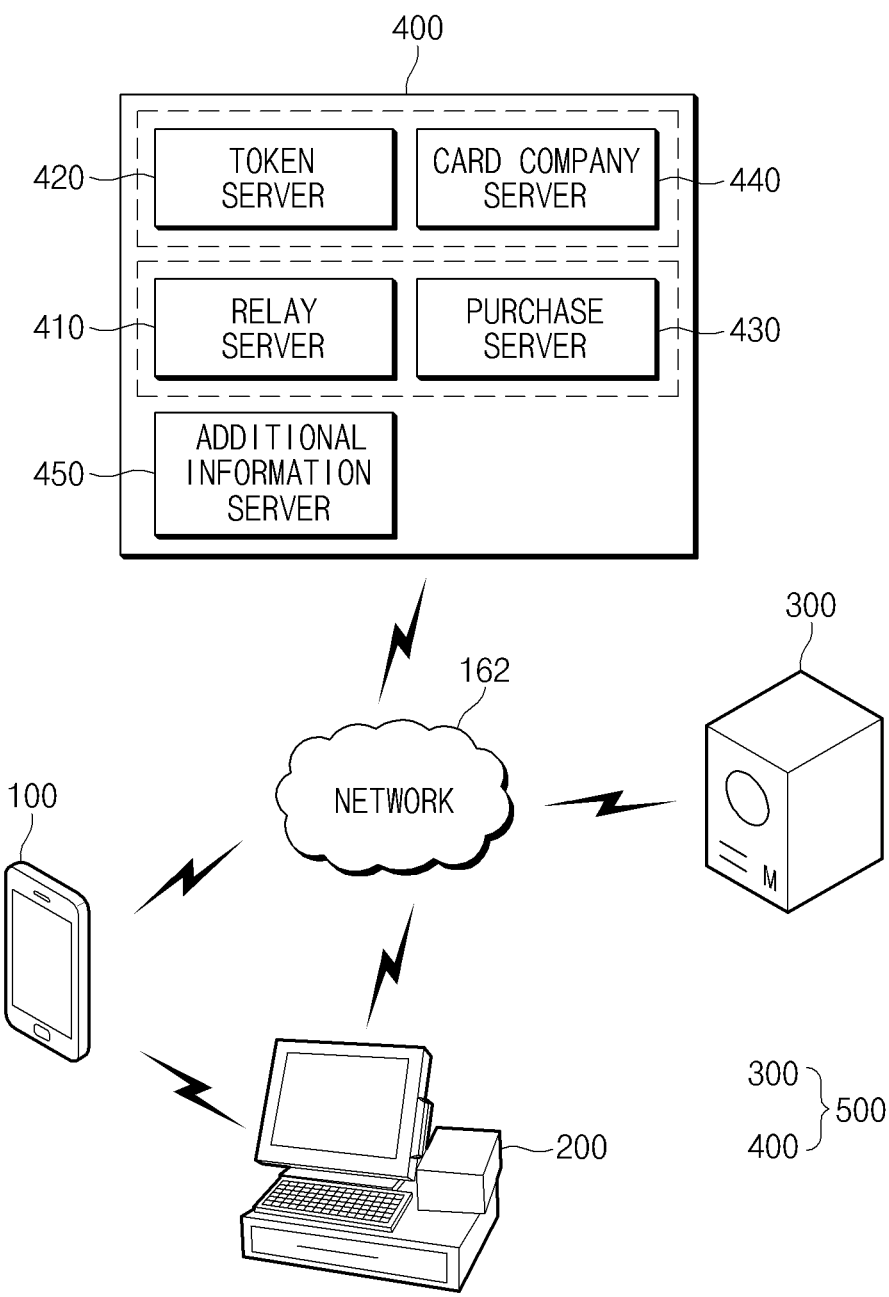
FIG. 1A is a view illustrating an information processing environment according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different user devices regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation. For example, the term "configured to" may not necessarily mean "specifically designed to" in terms of hardware. Instead, the expression "a device configured to" in some situations may mean that the device and another device or part are "capable of". For example, "a processor configured to perform A, B, and C" in a phrase may mean a dedicated processor (for example, an embedded processor) for performing a corresponding operation or a generic-purpose processor (for example, a CPU or application processor) for performing corresponding operations by executing at least one software program stored in a memory device.

Terms used in various embodiments of the present disclosure are used to describe specific embodiments of the present disclosure, and are not intended to limit the scope of other embodiments. The terms of a singular form may include plural forms unless they have a clearly different meaning in the context. Unless otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any case, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop personal computers, laptop personal computers, netbook computers, workstation server, personal digital assistants (PDAs), portable multimedia player (PMPs), Moving Picture Experts Group phase 1 or phase 2 (MPEG-1 or MPEG-2) audio layer 3 (MP3) players, mobile medical devices, cameras, and wearable devices (for example, smart glasses, head-mounted-devices (HMDs), electronic apparel, electronic bracelets, electronic necklaces, electronic appcessories, electronic tattoos, smart mirrors, and smart watches).

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1A is a view illustrating an information processing environment according to an embodiment of the present disclosure.

Referring to FIG. 1A, the information processing environment 10 may include an electronic device 100, a reader device 200, a payment support server 500, and a network 162.

In correspondence to the reception of payment request information (for example, application identifier (AID)) from the reader device 200, the electronic device 100 may deliver payment related information including payment information and additional service information to the reader device 200. As mentioned above, as the electronic device 100 provides payment related information including both payment information and additional service information at once, the information processing environment 10 may process additional service information more quickly and easily. During this operation, the information processing environment 10 may process additional service information, being separated from a user input, according to a setting, or process additional service information according to a user setting or a user input, so that it may support various additional service information processing situations easily.

The network 162 may support a communication channel establishment between at least one electronic device or one or more servers included in the information processing environment 10. For example, the network 162 may support a communication channel between the reader device 200 and a payment execution server 400 (for example, a relay server 410 or a purchase server 430 (or an acquirer)) and a communication channel establishment between servers included in the payment support server 500. Additionally, the network 162 may support a communication channel establishment between the electronic device 100 and a management device 300.

The reader device 200 may perform information transmission/reception relating to payment progress. The reader device 200, for example, may include a reader (or a reader module), a point of sales (POS) device, and so on. The reader device 200 may include an input device and transmit (or send) specified payment request information (for example, an application identifier) according to an administrative manipulation. The reader device 200 may receive payment related information corresponding to payment request information, from the electronic device 100. The reader device 200 may deliver the received payment related information to the relay server 410 (or the purchase server 430). Alternatively, the reader device 200 may parse content included in payment related information and deliver the parsed content to the relay server 410 (or the purchase server 430). The reader device 200 may perform payment request information transmission according to a pre-agreed manner with the electronic device 100. For example, the reader device 200 may transmit payment request information based on near field communication (NFC).

The payment support server 500 may establish a communication channel with the reader device 200 and may include at least one server for performing payment progress related authentication and payment processing (or processing of payment transaction). Additionally, the payment support server 500 may include a server for the additional service information processing of the electronic device 100. The payment support server 500 may include the management server 300 and the payment execution server 400.

The payment execution server 400 may include at least one of a card company server 440 (or a token server 420), the relay server 410 (or the purchase server 430), and an additional information server 450. The payment execution server 400 may be reconfigured in various forms according to a design scheme or may be configured with servers having different names According to an embodiment of the present disclosure, the payment execution server 400 may include the relay server 410, the card company server 440, and the additional information server 450. Alternatively, the payment execution server 400 may include the token server 420, the card company server 440, and the additional information server 450. Alternatively, the payment execution server 400 may include the token server 420, the purchase server 430, the card company server 440, and the additional information server 450.

As mentioned above, in relation to the payment execution server 400, some components may be further added or excluded according to a payment execution related policy. Additionally, server components included in the payment execution server 400 are divided according to the type or size of a role to be performed, so that they may be implemented as an individual server or implemented integrally.

The relay server 410, for example, may collect and manage sales slips on behalf of the card company server 440. In relation to this, the relay server 410 may deliver payment related information received from the reader device 200, to another server (for example, the card company server 440). According to an embodiment of the present disclosure, the relay server 410 may check the type of a card company server that is to process payment related information received from the reader device 200 and perform a control to deliver payment related information to a corresponding card company server. Additionally, upon the receipt of a payment processing result from the card company server 440, the relay server 410 may deliver it to the management server 300. During this operation, the relay server 410 may extract payment information in the received payment related information and deliver the extracted payment information to the card company server 440. Alternatively, the relay server 410 may receive payment information and additional service information from the reader device 200. In this case, the relay server 410 may deliver payment information received from the reader device 200, to the card company server 440. The relay server 410 may deliver received (or extracted) additional service information to the management server 300. The relay server 410, for example, may include a value added network (VAN) server.

The purchase server 430 and the token server 420 may be provided in replacement of the purchase server 430 or separately. Similar to some functions of the relay server 410, the purchase server 430 may receive payment related information from the reader device 200. The purchase server 430 may extract payment information and additional service information from payment related information and deliver the payment information to the token server 420. Alternatively, the purchase server 430 may receive payment information and additional service information from the reader device 200. The purchase server 430 may provide received (or extracted) payment information to the token server 420 and deliver received (or extracted) additional service information to the additional information server 450 or the management server 300. After providing a part (for example, a payment amount) of payment information and additional service information to the additional information server 450, the purchase server 430 may deliver an additional service information processing result received from the additional information server 450, to the management server 300.

When receiving payment information from the purchase server 430, the token server 420 may check the validity of the payment information. For example, the token server 420 may check payment identification information (for example, token information) included in the payment information and when the payment identification information is valid, deliver the payment information to the card company server 440. The token server 420 may receive a payment processing result from the card company server 440 and provide it to the management server 300. Although it is described above that the purchase server 430 processes additional service information, the token server 420 may process the additional service information. In this case, the token server 420 may receive additional service information from the purchase server 430 and provide the received additional service information and part (for example, amount information) of payment information to the additional information server 450.

The token server 420, for example, may be a server for issuing a token. The token server 420, for example, may operate in order to issue a token and manage a token service provider (TSP). The TSP, for example, may be a token issuance related server operated by the card company server 440 or a corresponding card company server, for example, VISA, Master card, Amex, and so on.

The card company server 440 may process identification and verification of payment information and token assurance. The verification process may be performed by direct call, OTP (or one of ARS, short message service (SMS), and E-mail), or an application of each card issuer. When a user authentication for an issued card and token is completed, the card company server 440 may perform normal card and token processing.

The additional information server 450 may include at least one server for processing additional service information. For example, the additional information server 450 may include at least one of a server for processing advertising information, a server for processing a coupon provided from the electronic device 100, a server for processing a discount card provided from the electronic device 100, and a server for processing the earning of membership points provided from the electronic device 100. The additional information server 450 may receive a part of payment information of the electronic device 100 and additional service information from at least one of the relay server 410, the purchase server 430, the token server 420, and the management server 300, according to certain rules. The additional information server 450 may process the received some payment information and the additional service information. For example, the additional information server 450 may collect or generate an advertisement to be provided to the electronic device 100. The additional information server 450 may discount a payment amount of the electronic device 100 and perform additional service information processing to provide the discounted amount. The additional information server 450 may check some payment information of the electronic device 100 and provide a giveaway in relation to payment information, or may perform additional service information processing to earn membership points. Alternatively, the additional information server 450 may process coupon related additional service information provided from the electronic device 100 or issue a coupon, so that it may process additional service information to be provided to the electronic device 100. The additional information server 450 may directly provide an additional service information processing result to the electronic device 100 or provide it to the electronic device 100 through the management server 300. Alternatively, the additional information server 450 may provide an additional service information processing result to the management server 300 through the relay server 410, the purchase server 430, or the token server 420.

The management server 300, for example, may perform user account management, management of a token request server through a web interface, and token management. According to various embodiments of the present disclosure, the management server 300 may be a server for managing the payment related information processing of the electronic device 100. The management server 300 may establish a communication channel with the electronic device 100 based on the network 162.

According to an embodiment of the present disclosure, the management server 300 may receive payment information and additional service information from the relay server 410. The management server 300 may provide the received payment information and additional service information to the additional information server 450. At this point, the management server 300 may check to which additional information server 450 corresponding information is to be provided by checking the additional service information. The management server 300 may provide the payment information and the additional service information to the confirmed additional information server 450 and receive the processing result of the additional service information from the additional information server 450. The management server 300 may provide the received processing result of the additional service information to the electronic device 100. During this operation, the management server 300 may provide a payment processing result (or the processing result of a payment transaction) and the processing result of additional service information simultaneously or separately.

Moreover, although it is described above that additional service information is processed by the management server 300, according to server role distribution, server integration, or addition of a new server, the relay server 410 may process additional service information and deliver its result to the management server 300. For example, the relay server 410 may deliver extracted (or received) additional service information to the additional information server 450 and receive the processing result of the additional service information. The relay server 410 may deliver the received processing result of the additional service information to the management server 300.

Additionally, although it is described above that the card company server 440 and the additional information server 450 are each in separate form, various embodiments of the present disclosure are not limited thereto. For example, the card company server 440 and the additional information server 450 may have an integrated form. Alternatively, according to the type of additional service information, the card company server 440 may process additional service information. For example, the card company server 440 may receive payment information and additional service information and determine to which degree a payment amount is discounted or to which degree membership points are earned with respect to a payment amount by checking the additional service information. When the card company server 440 is designed to process at least some additional service information, it may deliver a payment processing result and the processing result of additional service information to the management server 300.

According to an embodiment of the present disclosure, the relay server 410 may be omitted. Since it is inefficient for member stores to have all payment terminals corresponding to various card companies, an integrated reader device 200 may provide payment information (for example, card information, billing information, member store number, item number, transaction time, and so on) to the relay server 410, and request approval for payment information from an appropriate card company server 440. According to some embodiments of the present disclosure, the reader device 200 may be directly connected to the card company server 440. In such an embodiment of the present disclosure, all functions performed by the relay server 410 may be performed by the reader device 200.

When receiving specified payment request information (for example, AID) from the reader device 200, the electronic device 100 may operate a payment application corresponding to the payment request information. The electronic device 100 may generate payment related information by using a payment application. For example, the electronic device may generate payment related information including payment information (for example, payment amount, product information, identification information of the reader device 200, and store information) included in payment request information provided from the reader device 200 and additional service information.

The additional service information may be information that is processed additionally in relation to payment progress. For example, the additional service information may include at least one of discount card information for providing a discount service in relation to payment, membership point earning card relating to payment amount, coupon information for discounting payment amount or receiving a giveaway during payment, and payment related advertisement approval information (or advertisement information). The electronic device 100 may write, on payment related information, additional service information selected by at least one of information provided from the outside, user setting, and user input.

The electronic device 100 may be an electronic device with a payment function. For example, a payment available payment application may be installed on the electronic device. According to various embodiments of the present disclosure, a membership management application for providing payment and membership earning functions may be installed on the electronic device 100. According to an embodiment of the present disclosure, credit card information available for a plurality of payments may be stored in the membership management application.

A user may purchase a product at a store (for example, a membership store) by using the electronic device 100. For example, payment may be made through the reader device 200 of a store, which reads card information from the electronic device 100. Herein, similar to a POS terminal, the reader device 200 may typically include a means such as a barcode reader, an optical scanner, or a card reader (for example, a magnetic stripe reader), which reads a barcode attached to a product or barcode corresponding to card information. Additionally, the reader device 200 may be understood as a computing device coupled to the means, for example, a PC.

According to an embodiment of the present disclosure, before payment, for example, when executing an application for payment, the electronic device 100 may obtain payment identification information (for example, token and one-time card information or one-time code (OTC)) through communication with an external server. According to an embodiment of the present disclosure, the payment identification information may include bank information number (BIN) included in a one-time real card number, a 7-digit one time code (OTC), and a check sum. The payment identification information may further include information for identifying the user of the electronic device 100 through the card company server 440 and for checking the specific additional service information processing of the user with respect to the additional information server 450. The BIN may be information (for example, number) corresponding to a financial institute (for example, a card company or a bank) of a corresponding actual card in information on an actual card (for example, a credit card or a check card) registered to the electronic device 100. The BIN may not be encrypted or modulated in the card company server 440 and may be included in payment identification information provided from the card company server 440 to the electronic device 100. The relay server 410 may determine a target (for example, the card company server 440) to which a payment approval request message is to be transmitted based on the BIN information.

According to an embodiment of the present disclosure, when a payment application is executed on the electronic device 100 in order for payment and a credit card to be used for payment is selected, the electronic device 100 may request payment identification information for the credit card from a predetermined server, for example, the card company server 440. The card company server 440 may obtain payment identification information by communicating with a financial server corresponding to the credit card, for example, the card company server 440 and provide the obtained payment identification information to the electronic device 100. According to an embodiment of the present disclosure, the electronic device 100 may include a module for directly generating payment identification information, and directly generate and operate payment identification information. During this operation, the electronic device 100 may generate payment identification information by obtaining information used for payment identification information generation through communication with the card company server 440 or may directly generate payment identification information based on stored information without communicating with the card company server 440.

Figure 1B:
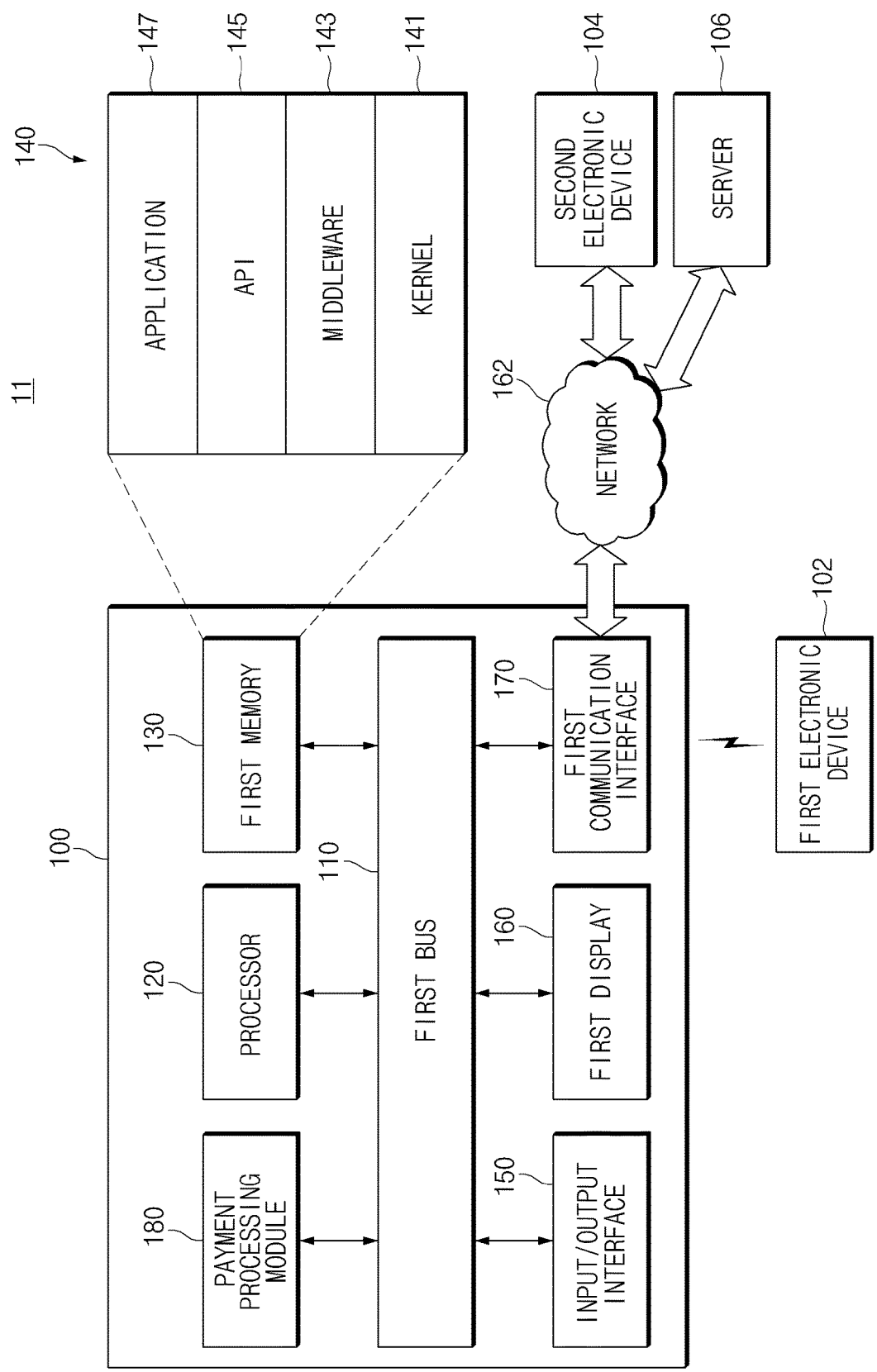
FIG. 1B is a view illustrating an electronic device operation environment according to an embodiment of the present disclosure.

FIG. 1B is a view illustrating an electronic device operation environment according to an embodiment of the present disclosure.

Referring to FIG. 1B, an electronic device operation environment 11 may include an electronic device 100, a network 162, a first electronic device 102, a second electronic device 104, and a server device 106.

Referring to FIG. 1B, the electronic device 100 may include a first bus 110, a processor 120, a first memory 130, an input/output interface 150, a first display 160, and a first communication interface 170. According to an embodiment of the present disclosure, the electronic device 100 may omit at least one of the components or may additionally include a different component. According to an embodiment of the present disclosure, the electronic device 100 may include a payment processing module 180.

The first bus 110, for example, may include a circuit for connecting the components 110 to 180 to each other and delivering a communication (for example, control message and/or data) between the components 110 to 180.

The processor 120 may include at least one of a central processing unit (CPU), an application Processor (AP), and a communication processor (CP). The processor 120, for example, may execute calculation or data processing for control and/or communication of at least one other component of the electronic device 100. According to an embodiment of the present disclosure, the processor 120 may perform a control to operate a payment application at the request of the payment processing module 180. According to an embodiment of the present disclosure, the processor 120 may include the payment processing module 180.

The payment processing module 180 may check payment request information received from the outside, and deliver it to the processor 120 or perform payment processing according to the content of the payment request information. For example, when receiving a specified application identifier, the payment processing module 180 may control a payment application operation by providing a request to the processor 120. When the payment application operates, the payment processing module 180 may provide the received application identifier information to the payment application. During the above operation, after the payment processing module 180 executes a payment application in correspondence to a user input or a specified event occurrence, if a user authentication (for example, fingerprint authentication or password input authentication) is completed, the payment processing module 180 may have a reception preparation state of an application identifier based on the payment application.

When receiving application identifier information relating to a payment processing method (for example, a peer to peer (P2P) method), which is executed regardless of a payment application operation, the payment processing module 180 may perform payment processing based on payment means information (for example, credit card, check card, prepaid card, point card, and so on) stored in an additional specified storage place (for example, a secure storage place, embedded secure element (eSE), universal integrated circuit card (UICC), and so on). According to an embodiment of the present disclosure, the payment processing module 180 may transmit payment related information including additional service information or payment identification information wirelessly through an NFC or magnetic stripe transmission (MST) module provided in the first communication interface 170. The payment processing module 180, for example, may include an NFC control module (or an NFC controller).

The first memory 130 may include volatile and/or non-volatile memory. The first memory 130, for example, may store instructions or data relating to at least one other component of the electronic device 100. The instructions may be executed by at least one of the processor or the payment processing module 180. The instructions may include instructions set in relation to payment related information generation (or writing) including payment information and additional service information or instructions set to output payment related information (for example, transmit it to a reader device or display it on a display). Additionally, the instruction may include at least one instruction for function performance relating to the acquisition, output, and processing of payment related information, a payment processing result, and an additional service information processing result, which are described below.

According to an embodiment of the present disclosure, the first memory 130 may store software and/or program 140. The program 140 may include a kernel 141, a middleware 143, an application programming interface (API) 145, and/or an application program (or an application) 147. At least part of the kernel 141, the middleware 143, and the API 145 may be called an operating system (OS). According to an embodiment of the present disclosure, the first memory 130 may store a payment application and payment means information.

The kernel 141, for example, may control or manage system resources (for example, the first bus 110, the processor 120, the first memory 130, and so on) used for performing operations or functions implemented in other programs (for example, the middleware 143, the API 145, or the application program 147). Additionally, the kernel 141 may provide an interface for controlling or managing system resources by accessing an individual component of the electronic device 100 from the middleware 143, the API 145, or the application program 147.

The middleware 143, for example, may serve as an intermediary role for exchanging data as the API 145 or the application program 147 communicates with the kernel 141. Additionally, the middleware 143 may process at least one job request received from the application program 147 according to a priority. For example, the middleware 143 may assign to at least one application program 147 a priority for using a system resource (for example, the first bus 110, the processor 120, or the first memory 130) of the electronic device 100. For example, the middleware 143 may perform scheduling or load balancing on the at least one job request by processing the at least one job request according to the priority assigned to the at least one job request.

The API 145, for example, may include an interface that the application 147 uses to control a function provided from the kernel 141 or the middleware 143. The API 145, for example, may include at least one interface or function (for example, an instruction) for file control, window control, image processing, or character control.

The payment application may receive a specified application identifier or payment request information including a specified application identifier from the payment processing module 180. The payment application may receive store information in the received payment request information, information on the reader device 200, and recommendation additional service information used in relation to a product to be paid. The payment application may create payment related information based on the received information but create it to include specific additional service information in the payment related information. During this operation, the payment application may be written in payment related information including payment identification information (for example, one-time token information), information on a card for payment, and the additional service information. The payment application may provide the generated payment related information to the payment processing module 180.

The payment processing module 180 may deliver the payment related information received from the payment application, to the reader device 200. For example, the payment processing module 180 may provide the payment related information through at least one of an MST method, an NFC method, or a specified code image (for example, barcode or quick response (QR) code).

According to various embodiments of the present disclosure, the payment processing module 180 may receive at least one of a payment processing result and an additional service information processing result from the management server 300 simultaneously or separately. The payment processing module 180 may provide the received payment processing result and additional service information processing result to the payment application. The payment application may output at least one of the received payment processing result and additional service information processing result to the first display 160 or store it in the first memory 130. Alternatively, the payment processing module 180 may directly control at least one of the storage and display of the received payment processing result and additional service information processing result.

The input/output interface 150, for example, may serve as an interface for delivering instructions or data inputted from a user or another external device to another component(s) of the electronic device 100. Additionally, the input/output interface 150 may output instructions or data received from another component(s) of the electronic device 100 to a user or another external device.

The first display 160, for example, may include a liquid crystal display (LCD), a light emitting diode (LED) display, an organic light emitting diode (OLED) display, a microelectromechanical systems (MEMS) display, or an electronic paper display. The first display 160 may display various contents (for example, text, image, video, icon, symbol, and so on) to a user. The first display 160 may include a touch screen, and for example, may receive as an input a touch, a gesture, a proximity input, or a hovering input by using an electronic pen or a user's body part.

The first communication interface 170, for example, may set a communication between the electronic device 100 and an external device (for example, the first external electronic device 102, the second external electronic device 104, or the server 106). For example, the first communication interface 170 may communicate with an external device (for example, the second external electronic device 104 or the server 106) in connection to the network 162 through wireless communication or wired communication.

The wireless communication, as a cellular communication protocol, may use at least one of long-term evolution (LTE), LTE advance (LTE-A), code division multiple access (CDMA), wideband CDMA (WCDMA), universal mobile telecommunications system (UMTS), Wireless Broadband (WiBro), Global System for Mobile Communications (GSM), and so on. Additionally, the wireless communication, for example, may include short-range communication. The short range communication, for example, may include at least one of wireless fidelity (Wi-Fi), Bluetooth (BT), NFC, global positioning system (GPS), and so on.

Magnetic stripe transmission (MST) may be achieved using a short-range wireless communication module for transmitting data by using electromagnetic signals. The MST may generate pulses according to transmission data and the pulses may generate electromagnetic signals. The electronic device 100 may transmit the electromagnetic signals to an external device (for example, the first electronic device 102 or a reader device such as a POS device). The external device (for example, the first electronic device 102) may detect the magnetic signals by using an MST reader and restore data by converting the detected electromagnetic signals into electrical signals.

The global navigation satellite system (GNSS) may include at least one of GPS, Glonass, and Beidou Navigation Satellite System (hereinafter referred to as Beidou) and Galileo, that is, the European global satellite-based navigation system. Hereinafter, GPS and GNSS may be interchangeably used. The wired communication, for example, may include at least one of universal serial bus (USB), high definition multimedia interface (HDMI), recommended standard 232 (RS-232), plain old telephone service (POTS), and so on.

The network 162 may include a telecommunications network, for example, at least one of a computer network (for example, local area network (LAN) or wide area network (WAN)), an internet, and a telephone network.

Each of the first and second external electronic devices 102 and 104 may be the same or different type as the electronic device 100. According to an embodiment of the present disclosure, the server 106 may include a group of one or more servers. According to various embodiments of the present disclosure, all or part of operations executed on the electronic device 100 may be executed on another one or more electronic devices (for example, the electronic device 102 or 104 or the server 106). According to an embodiment of the present disclosure, when the electronic device 100 performs a certain function or service automatically or by a request, it may request at least part of a function relating thereto from another device (for example, the electronic device 102 or 104 or the server 106) instead of or in addition to executing the function or service by itself. The other electronic device (for example, the electronic device 102 or 104 or the server 106) may execute a requested function or an additional function and may deliver an execution result to the electronic device 100. The electronic device 100 may provide the requested function or service as it is or by processing the received result additionally. For this, for example, cloud computing, distributed computing, or client-server computing technology may be used.

According to an embodiment of the present disclosure, the electronic device 102 may correspond to a reader in various forms for reading magnetic information, card information, barcode, or QR code, which is similar to the above-mentioned POS device, or the reader device 200 including a POS device combined with a reader. Additionally, the server 106 may be a payment support server 500 communicating with the electronic device 100. Additionally, another device or server (for example, the relay server 410, the card company server 440, the additional information server 450, and so on), which configures an entire payment/membership earning server, may not directly communicate with the electronic device 100 but communicate with the electronic device 102 or the server 106, so that it may communicate with the devices shown in FIG. 2.

As mentioned above, an electronic device according to an embodiment of the present disclosure may include a memory for storing at least one instruction and a processor that is electrically connected to the memory, and the at least one instruction performed by the processor may be set to perform, when receiving an application identifier relating to payment execution, executing a payment application relating to the application identifier, and creating and outputting a message including payment related information including payment identification information and payment related additional service information based on the payment application.

According to various embodiments of the present disclosure, an electronic device may include a memory configured to store at least one instruction, and a processor connected to the memory, and the at least one instruction executed by the processor may be set to receive an application identifier for payment transaction from a reader device and generate payment related information including payment identification information for the payment transaction and additional service information relating to the payment transaction by a payment application corresponding to the application identifier.

According to various embodiments of the present disclosure, the at least one instruction executed by the processor, may be set to automatically write additional service code information corresponding to additional service information included in an additional list to the payment related information corresponding to reception of the additional list including at least one additional service information that is operable in relation to the payment transaction.

According to various embodiments of the present disclosure, the at least one instruction executed by the processor may be set to output a screen for selecting the additional service information while (or when) the payment transaction is performed and write code information corresponding to selected additional service information in the payment related information.

According to various embodiments of the present disclosure, the at least one instruction executed by the processor may be set to dispose the additional service information on at least one of a front end, rear end, and a middle end of a packet corresponding to the payment identification information.

According to various embodiments of the present disclosure, the at least one instruction executed by the processor may be set to encrypt the payment related information based on a sharing key and provide the encrypted payment related information to the reader device.

According to various embodiments of the present disclosure, the at least one instruction executed by the processor may be set to include at least one of membership card information, discount card information, coupon information, and advertisement information, which relate to the payment transaction, in the additional service information.

According to various embodiments of the present disclosure, the at least one instruction executed by the processor may be set to receive the payment identification information from an external server and store the received payment identification information.

According to various embodiments of the present disclosure, the at least one instruction executed by the processor may be set to transmit the payment related information through an NFC communication method.

According to various embodiments of the present disclosure, the at least one instruction executed by the processor may be set to receive at least one of a processing result of the payment transaction and a processing result of the additional service information from an external server.

According to various embodiments of the present disclosure, the at least one instruction executed by the processor may be set to display or store at least one of the received processing result of the payment transaction and the received processing result of the additional service information.

Figure 2:
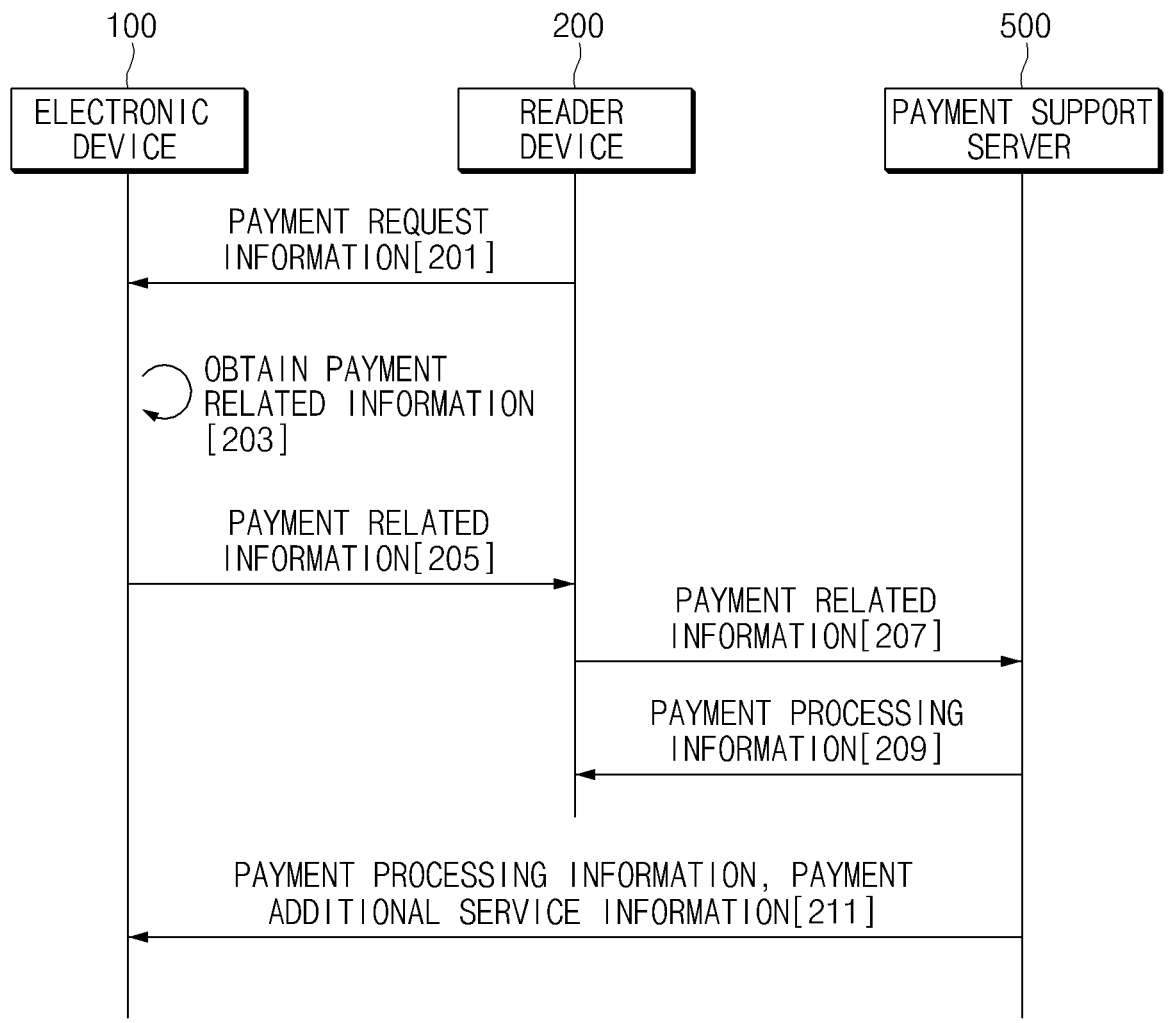
FIG. 2 is a view illustrating a signal flow of an electronic device relating to information processing according to an embodiment of the present disclosure.

FIG. 2 is a view illustrating a signal flow of an electronic device relating to information processing according to an embodiment of the present disclosure.

Referring to FIG. 2, in relation to a signal flow relating to the information processing of an electronic device, an electronic device 100 may receive payment request information from a reader device 200 in operation 201. In relation to this, the reader device 200 may output payment request information including application identifier information, payment amount to be processed, and payment product information in a predetermined period or in real time through a predetermined method according to the manipulation of an administrator. For example, the reader device 200 may output payment request information according to an NFC method. At this point, the reader device 200 may first transmit an application identifier including application identification information for processing payment request information and then output other information. Alternatively, the reader device 200 may transmit payment request information including an application identifier. When payment information is received, the electronic device 100 output it to the first display 160 in order for user confirmation. When receiving payment request information from the reader device 200, the electronic device 100 may check an application identifier and execute a payment application corresponding to a corresponding application identifier.

In operation 203, the electronic device 100 may obtain payment related information. In relation to this, the payment application of the electronic device 100 may create payment related information including payment information and additional service information. During this operation, the electronic device 100 may automatically write selected additional service information in payment related information according to a specified method.

According to an embodiment of the present disclosure, the electronic device 100 may receive payment request information including product information or store information from the reader device 200, or may receive it separately. The electronic device 100 may automatically select additional service information according to whether a specified condition is satisfied. For example, the electronic device 100 may select at least one additional service information (for example, at least one of membership card information, discount card information, coupon information, and advertisement related information) stored in the first memory 130 based on the received product information or store information. In relation to this, the electronic device 100 may include a mapping table that maps product information or store information to additional service information. Alternatively, the electronic device 100 may provide product information or store information to a specified search server and receive additional service information corresponding to a corresponding product or store information from a search server. Alternatively, the electronic device may provide the type (for example, the type of a membership card, the type of a discount card, and a coupon type) of product information or store information and additional service information to a specified search server. The electronic device 100 may automatically select additional service information recommended by a corresponding search server.

According to various embodiments of the present disclosure, the electronic device 100 may receive recommended additional service information from the reader device 200. The electronic device may write additional service information corresponding to the received recommended additional service information in payment related information automatically. According to an embodiment of the present disclosure, the electronic device 100 may automatically write additional service information in payment related information based on recommended information (for example, what type of additional service information in additional service information is to be provided) provided from the reader device 200. Alternatively, the electronic device 100 may automatically write additional service information in payment related information based on information (for example, information for obtaining card information, which is for getting the highest discount or earning the highest point in a corresponding store, from the reader device 200 or a web) relating to a store where the reader device 200 is disposed.

According to various embodiments of the present disclosure, the electronic device 100 may automatically write selected additional service information in payment related information according to a user setting. According to various embodiments of the present disclosure, the electronic device 100 may automatically write additional service information, which is pre-mapped in relation to a card for payment, in payment related information. Alternatively, the electronic device 100 may automatically write name information of a card for payment and additional service information having a matching name of more than a specified length according to a user setting. The electronic device 100 may select additional service information that is pre-mapped in relation to an amount to be paid according to a user setting. For example, the electronic device 100 may select first additional service information (for example, a membership card) until a predetermined amount payment and select second additional service information (for example, another membership card or discount card) until a predetermined amount payment greater than that.

According to various embodiments of the present disclosure, the electronic device 100 may write additional service information according to a user input in payment related information. In relation to this, the electronic device 100 may output an additional service information screen selected by a user to the first display 160. The electronic device 100 may write at least one additional service information selected by a user in payment related information.

In operation 205, the electronic device 100 may deliver payment related information to the reader device 200. During this operation, the electronic device 100 may deliver payment related information through at least one of an MST method and an NFC method. According to an embodiment of the present disclosure, the electronic device 100 may transmit payment related information according to an NFC method for a specified time and transmit payment related information according to an MST method after a specified time elapses. Alternatively, the electronic device 100 may output information written in a barcode form to the first display 160 in correspondence to payment related information. The barcode, for example, may be replaced with a 2D code or QR code or may be outputted together.

In operation 207, the reader device 200 may deliver payment related information to the payment support server 500. In relation to this, the reader device 200 may be connected to the payment support server 500 through the network 162. During this operation, the reader device 200 may deliver payment related information to the payment support server 500 (for example, the relay server 410 or the purchase server 430). Alternatively, the reader device 200 may extract payment information and additional service information from payment related information and deliver the extracted payment information and additional service information to the payment support server 500. According to various embodiments of the present disclosure, the reader device 200 may identify a server for delivering payment information and additional service information. For example, the reader device 200 may provide payment information to the card company server 440 and provide payment information and additional service information to the additional information server 450. Alternatively, when the card company server 440 supports additional service information processing, the reader device 200 may provide payment information and additional service information to the card company server 440.

In operation 209, the payment support server 500 may provide payment processing information to the reader device 200. The payment processing information, for example, may include a payment processing result according to payment information processing. According to an embodiment of the present disclosure, the card company server 440 may provide the payment processing result to the reader device 200. According to various embodiments of the present disclosure, the payment support server 500 may deliver payment additional service information corresponding to the processing result of the additional service information to the reader device 200. The reader device 200 may output at least one of the received payment processing information and payment additional service information to a display device.

Additionally, in operation 211, the payment support server 500 may provide payment processing information and payment additional service information to the electronic device 100. For example, the card company server 440 may provide payment processing information including payment processing result to the management server 300. The additional information server 450 may provide payment additional service information including the processing result of the additional service information to the management server 300. The management server 300 may check to which electronic device the collected payment processing information and payment additional service information is to be delivered. The management server 300 may transmit related payment processing information and payment additional service information to the checked electronic device 100.

Operation 209 or operation 211 may be performed to be identical substantially or may be performed regardless of a time order.

Figure 3:
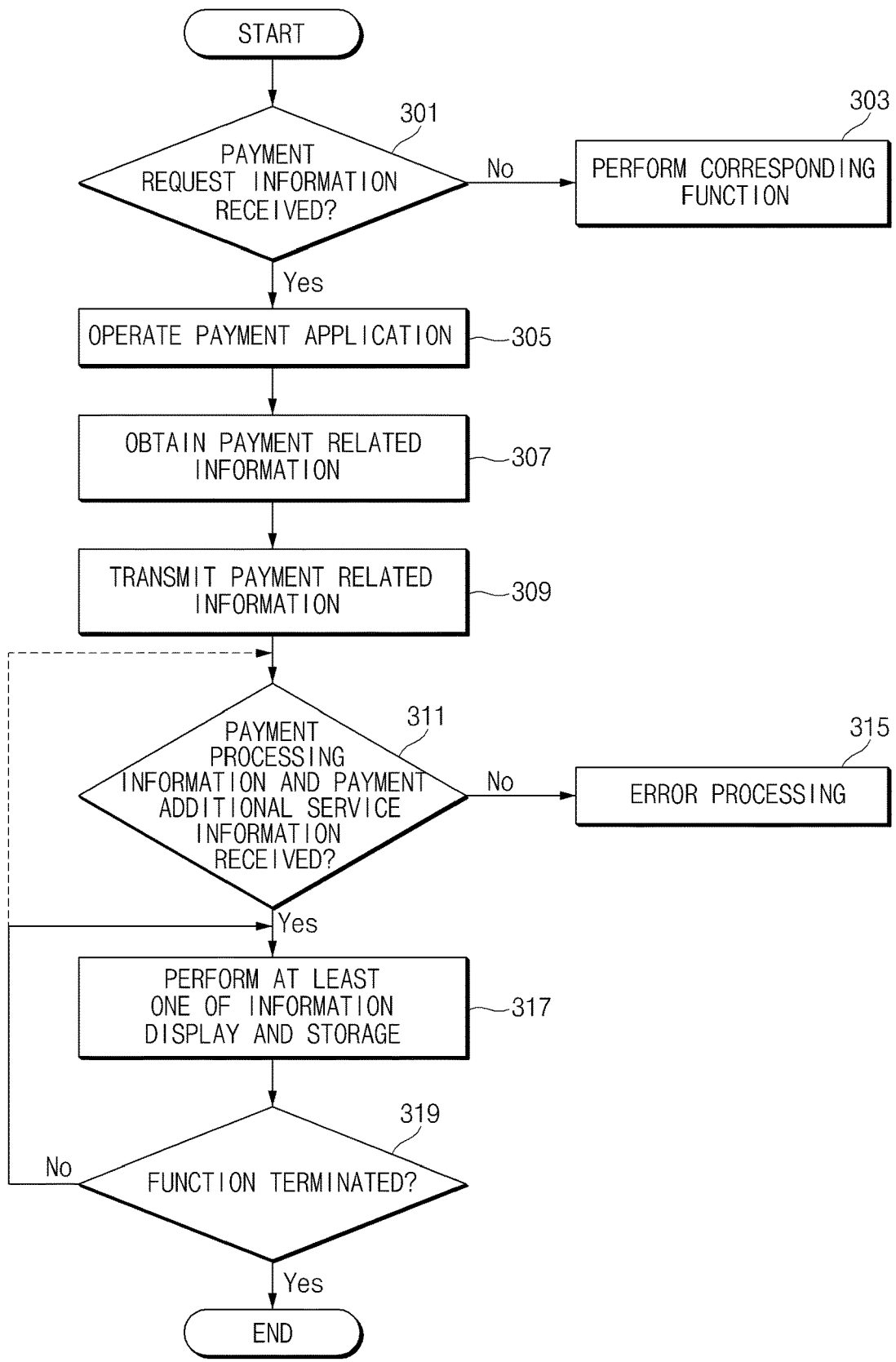
FIG. 3 is a flowchart illustrating an electronic device operating method according to an embodiment of the present disclosure.

FIG. 3 is a flowchart illustrating an electronic device operating method according to an embodiment of the present disclosure.

Referring to FIG. 3, in relation to an electronic device operating method according to an embodiment of the present disclosure, the electronic device 100 may check whether payment request information is received in operation 301. The payment request information may include identifier information of a payment application for payment. In relation to the payment request information reception, the electronic device 100 may process the payment request information reception by providing a payment application in a user authentication completed state, or activating a payment application in correspondence to a processor control. When a payment application is set to be activated in correspondence to the payment request information reception, the electronic device 100 may provide support to perform a user authentication operation (for example, fingerprint authentication).

If there is no specified payment request information reception, in operation 303, the electronic device 100 may process a specified function performance. For example, the electronic device 100 may have a preparation state for payment execution for a specified time. Alternatively, the electronic device 100 may perform a specified user function (for example, a music playback function, a message display function, and so on). Alternatively, if there is data reception within a specified time, the electronic device 100 may transmit a data search failure message to the reader device 200 and return to a payment information reception state. Alternatively, when an application identifier corresponding to a payment method for directly operating information stored in a secure storage without a payment application operation is received, the payment processing module 180 of the electronic device 100 may perform payment processing corresponding to a corresponding application identifier. For example, the payment processing module 180 may obtain payment identification information according to the received application identifier from a secure storage and based on this, perform payment processing.

If there is a specified payment request information reception, in operation 305, the electronic device 100 may operate a payment application. According to an embodiment of the present disclosure, while executing a payment application, the electronic device 100 may support processing relating to the performance of a self-authentication (for example, fingerprint authentication or authentication of a specified password input) and when the self-authentication is completed, have an application identifier reception state. In this case, in operation 305, when an application identifier is received in a pre-activate state, the payment application may perform the following operation processing according to the application identifier reception.

According to various embodiments of the present disclosure, when a specified signal is received through an NFC antenna, the electronic device 100 may process a corresponding signal based on a payment operation processor (for example, a payment processing platform or a host card emulator). When the specified signal includes a specified payment application identifier, the payment operation processor may request a payment application execution request from a processor (for example, an AP). The processor may execute a payment application.

In operation 307, the electronic device 100 may obtain payment related information. For example, the electronic device 100 may extract payment situation information (for example, payment amount, store information, product information, and so on) included in the payment request information. The electronic device 100 may collect payment means information (for example, credit card information) and additional service information (for example, membership card information, coupon information, advertisement information, and so on), which are stored in the first memory 130. Additionally, the electronic device 100 may collect payment identification information (for example, token information). In relation to the payment identification information collection, the electronic device 100 may request payment identification information from the card company server 440 and receive it during a process for registering a payment card to the card company server 440, in a specified period, or according to a payment identification information update request. Alternatively, the electronic device 100 may generate payment identification information based on a specified algorithm. The electronic device 100 may create payment related information including at least one of payment situation information (for example, store information, product information, payment amount, payment time information, and so on), payment means information (for example, payment card information), payment identification information, and additional service information.

In operation 309, the electronic device 100 may transmit payment related information. The electronic device 100 may operate a communication method (for example, at least one of an NFC method, an MST method, and a barcode method) according to a user setting during payment related information transmission. For example, the electronic device 100 may transmit payment related information through a method identical to a communication method executed during a process for receiving payment request information. Alternatively, the electronic device 100 may alternatively operate an NFC method and an MST method at a specified time period. Alternatively, the electronic device 100 may operate a barcode method separately from an NFC method and an MST. Alternatively, the electronic device may alternately operate an NFC method and an MST method while outputting barcode to the first display 160.

In operation 311, the electronic device 100 may check whether payment processing information and payment additional service information are received. When the payment processing information and the payment additional service information are not received, the electronic device 100 may perform error processing in operation 315. For example, the electronic device 100 may output information for guiding that information to be received is not received within a specified time. According to various embodiments of the present disclosure, the electronic device 100 may terminate the payment application and return to a previous function without additional error processing in operation 315.

When the payment processing information and the payment additional service information are received, the electronic device 100 may perform at least one of displaying and storing information in operation 317. For example, the electronic device 100 may output a payment processing result included in payment processing information to the first display 160. Additionally, the electronic device 100 may output an additional service information processing result included in payment additional service information to the first display 160. During the output process, the electronic device 100 may display the payment processing result and the additional service information processing result at the same time. When a payment processing result is received first, the electronic device 100 may first output a corresponding payment processing result. After that, when an additional service information processing result is received, the electronic device 100 may perform the output of the payment processing result and the additional service information processing result through a split screen. Alternatively, after a result received first is temporarily stored until the payment processing result and the additional service information processing result are all received, after they are all received, the electronic device 100 may output them. The electronic device 100 may store payment processing information and payment additional service information by default. Alternatively, the electronic device 100 may store payment processing information and payment additional service information in correspondence to a user selection.

In operation 319, the electronic device 100 may check whether there is a function termination related event occurrence. When a function termination related event occurs, the electronic device 100 may terminate the payment function. When a function termination related event does not occur, the electronic device 100 may branch into at least one of operation 317 and operation 311 according to a situation. Alternatively, if there is no function termination related event occurrence, the electronic device 100 may branch into operation 309 and perform subsequent operations again.

According to an embodiment of the present disclosure, the electronic device 100 may maintain an information display state for a specified time in operation 317 and when the specified time elapses, automatically terminate a payment function (for example, a payment application). When one of the payment processing information and the payment additional service information is received, the electronic device 100 may check whether other information is received in operation 311 and perform processing according thereto.

Figure 4:
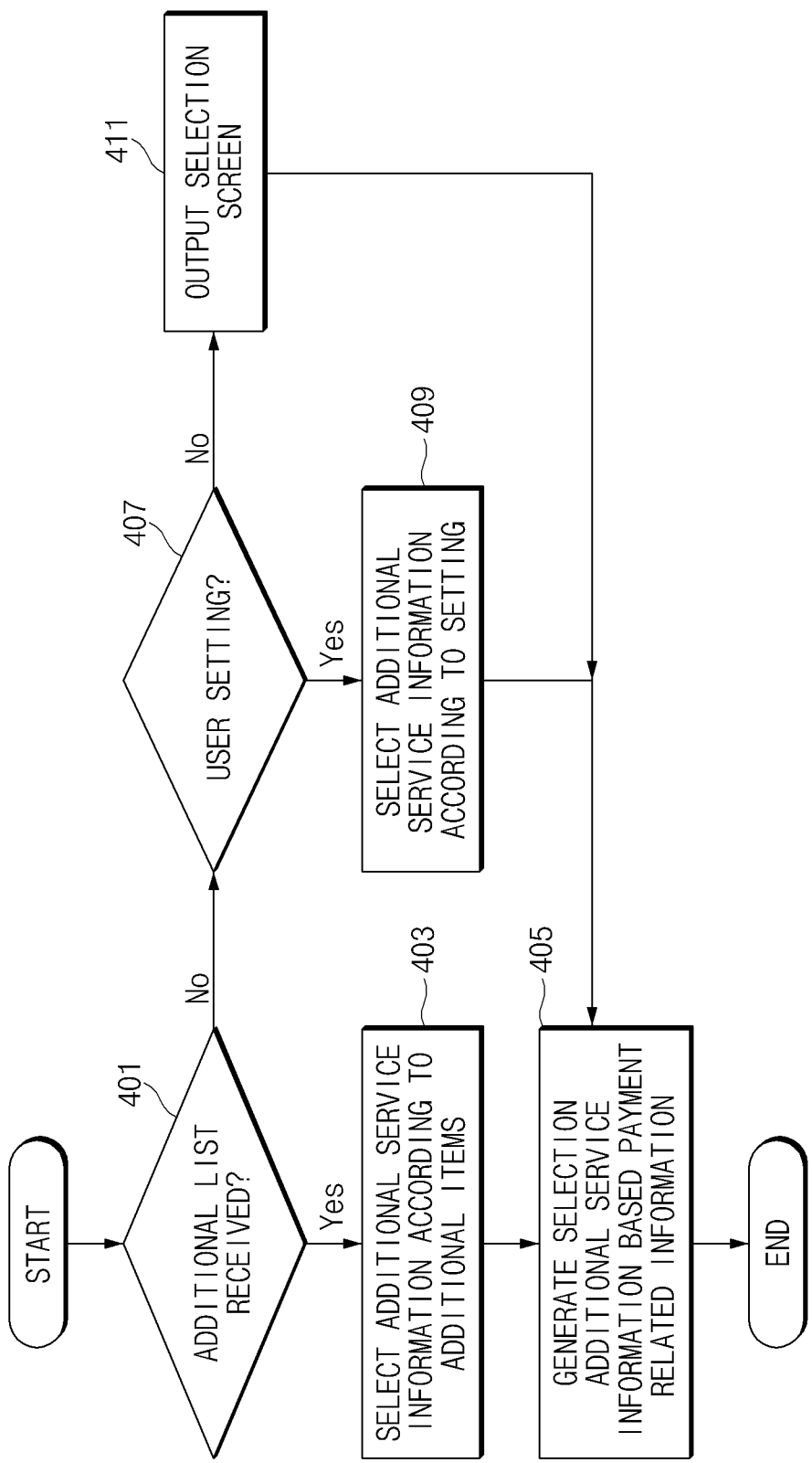
FIG. 4 is a view illustrating the payment related information generation of an electronic device according to an embodiment of the present disclosure.

FIG. 4 is a flowchart illustrating the generation of payment related information in an electronic device according to an embodiment of the present disclosure.

Referring to FIG. 4, in relation to the payment related information generation of an electronic device, in operation 401, the electronic device 100 may check whether an additional list is received. The additional list may include additional items for recommending additional service information available for a store where the reader device 200 is installed. The additional list may be in a state that additional service information available for a store where the reader device 200 is installed is arranged in a predetermined order. For example, the additional list may include additional service information arranged according to a membership point amount that is to be earned through a product purchased at the store (for example, as a point amount is greater, it is disposed at an upper location). The additional list may include additional service information arranged according to the amount of a discount rate of a product purchased at the store. The additional list may be provided to the electronic device 100 through the reader device 200. The additional list may deliver information provided from the reader device 200 or the relay server 410 to the electronic device 100 through the reader device 200.

When an additional list is received, in operation 403, the electronic device 100 may automatically select additional service information according to additional items included in an additional list. For example, the electronic device 100 may check whether there is information that matches information stored in the first memory 130 among additional items in an additional list. If matching additional service information exists, the electronic device 100 may automatically write the matching additional service information in payment related information. During this operation, the electronic device 100 may make a comparison sequentially according to an arrangement order of additional items included in an additional list and select additional service information for applying a relatively high point earning rate or discount rate. If there is no information that matches items included in an additional list, the electronic device 100 may write given specific additional service information in payment related information.

If an additional list is not received, in operation 407, the electronic device 100 may check whether there is a user setting relating to additional service information processing. If there is a user setting, in operation 409, the electronic device 100 may select additional service information according to the user setting. For example, the electronic device 100 may check a mapping table where store information or product information is mapped into additional service information. The electronic device 100 may automatically write additional service information written in the mapping table, in payment related information. If there is no information mapped into store or product information, the electronic device 100 may automatically write additional service information specified by default in payment related information. Alternatively, if there is no mapping information, the electronic device 100 may not write additional service information but write information for guiding that there is no additional service information in payment related information.

If there is no user setting, in operation 411, the electronic device 100 may output a selection screen for selecting at least one additional service information. For example, the electronic device 100 may output, to a display, a selection screen including an image or text for selecting additional service information stored in the first memory 130. The electronic device 100 may write additional service information selected from the selection screen in payment related information.

As mentioned above, when additional service information is selected in operation 403, operation 409, or operation 411, the electronic device 100 may process payment related information generation based on the selected additional service information in operation 405.

If no additional service information is selected, the electronic device 100 may generate payment related information not included in additional service information. During this operation, the electronic device 100 may output guide information for guiding that additional service information is not included, through a display or audio module.

Although it is described above that whether an additional list is received, whether a user setting is checked, and whether selection information is received according to a selection screen are divided according to a relationship, various embodiments of the present disclosure are not limited thereto. For example, the electronic device 100 may first check whether there is a user setting during a process for generating payment related information. If there is a user setting, the electronic device 100 may process payment related information generation according to a corresponding user setting. Alternatively, when receiving payment request information from the reader device 200, the electronic device 100 may output a selection screen for selecting an additional service information processing method (for example, an additional list based processing method, a processing method according to a user setting, and a processing method according to user's additional service information selection). The electronic device 100 may process payment related information generation based on a processing method selected by a user. During this operation, the electronic device 100 may first perform processing according to whether an additional list is received or first perform processing according to whether there is a user setting.

As mentioned above, a payment additional service information processing method according to an embodiment of the present disclosure may include receiving an application identifier relating to payment execution, executing a payment application relating to the application identifier, collecting payment related information including payment identification information and payment related additional service information based on the payment application, and outputting the payment related information.

As mentioned above, a payment additional service information processing method according to an embodiment of the present disclosure may include receiving an application identifier for payment transaction from a reader device, generating payment related information including payment identification information for the payment transaction and additional service information relating to the payment transaction by a payment application corresponding to the application identifier, and transmitting the payment related information to the reader device.

According to various embodiments of the present disclosure, the method may further include receiving an additional list that includes at least one additional service information that is operable in relation to the payment performance and automatically writing additional service code information corresponding to additional service information included in the additional list, in the payment related information.

According to various embodiments of the present disclosure, the method may include outputting a screen for selecting the additional service information during the payment transaction execution and writing code information corresponding to the selected additional service information in the payment related information.

According to various embodiments of the present disclosure, the generating of the payment related information may further include disposing the additional service information on at least one of the front end, rear end, and middle end of a packet corresponding to the payment identification information and outputting (or transmitting) the additional service information.

According to various embodiments of the present disclosure, the method may further include establishing a security channel with a reader device for providing the application identifier and providing the payment related information to the reader device through the security channel.

According to various embodiments of the present disclosure, the generating of the payment related information may include containing at least one of membership card information, discount card information, coupon information, and advertisement information, which relate to the payment transaction, as the additional service information, in the payment related information.

According to various embodiments of the present disclosure, the method may further include receiving the payment identification information from a specified card company server and storing the received payment identification information.

According to various embodiments of the present disclosure, the outputting of the payment related information may include at least one of transmitting the payment related information through an NFC communication method, transmitting the payment related information through an MST communication method, and displaying the payment related information through a barcode method.

According to various embodiments of the present disclosure, the method may further include receiving at least one of a processing result of the payment transaction and a processing result of the additional service information.

According to various embodiments of the present disclosure, the method may further include displaying at least one of a processing result of the payment transaction and a processing result of the additional service information or storing the at least one.

Figure 5:
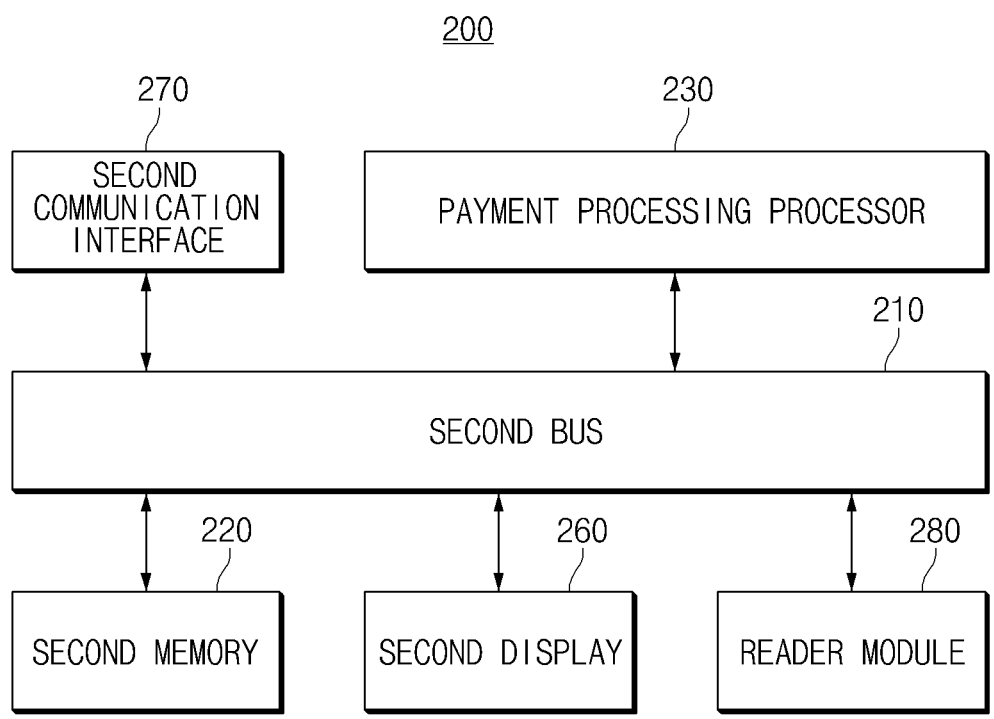
FIG. 5 is a view illustrating a reader device according to an embodiment of the present disclosure.

FIG. 5 is a view illustrating a reader device according to an embodiment of the present disclosure.

Referring to FIG. 5, a reader device 200 may include a second bus 210, a second memory 220, a payment processing processor 230, a second display 260, a second communication interface 270, and a reader module 280.

The second bus 210 may include at least one circuit for processing signal delivery between the components 220 to 280 included in the reader device 200. For example, the second bus 210 may deliver payment processing related information to the second display 260 and deliver touch information occurring from the second display 260 of a touch function to the payment processing processor 230. Additionally, the second bus 210 may deliver payment request information to the second communication interface 270 and deliver payment related information that the second communication interface 270 receives to the payment processing processor 230.

The second memory 220 may store at least one program and data used for an operation of the reader device 200. For example, the second memory 220 may store product information, store information, and application identifier information. Additionally, the second memory 220 may store connection information of the relay server 410. The second memory 220 may store payment related information received from the electronic device 100. Additionally, the second memory 220 may store payment information and additional service information, which are extracted from the payment related information.

The second display 260 may provide at least one screen relating to an operation of the reader device 200. For example, the second display 260 may display product information (for example, the type of a product, the price of a product, unique identification information of a product, and so on) relating to payment progressing. The second display 260 may support a touch function. The second display 260 may deliver product selection information corresponding to a touch input to the payment processing processor 230. According to various embodiments of the present disclosure, the second display 260 may output at least one of a product selection (or scan) screen, a payment request information transmission related screen, a payment related information reception related screen, a payment processing result screen, and an additional service information processing result screen.

The second communication interface 270 may include at least one communication module for supporting a communication function of the reader device 200. For example, the second communication interface 270 may include a communication module (for example, an NFC type communication module or an MST type communication module) for transmitting payment request information to the electronic device 100 or receiving payment related information. Additionally, the second communication interface 270 may include a scanner for recognizing payment related information provided in a barcode form. According to various embodiments of the present disclosure, the second communication interface 270 may include a communication module for communicating with the payment support server 500 (for example, the relay server 410 or the purchase server 430). A communication module that communicates with the payment support server 500 may include an internet access available communication module.

The reader module, for example, may include at least one device for transmitting payment request information to the electronic device 100 and receiving payment related information from the electronic device 100. For example, the reader module 280 may transmit payment request information including an application identifier to the electronic device 100 by operating an NFC communication module included in the second communication interface 270. The reader module 280 may receive payment related information from the electronic device 100. The reader module 280 may deliver the received payment related information to the payment processing processor 230.

The payment processing processor 230 may perform processing relating to a payment function of the reader device 200. According to an embodiment of the present disclosure, the payment processing processor 230 may transmit payment request information, receive payment related information, deliver payment related information, extract additional service information included in payment related information, deliver payment information and additional service information, and provide an additional list. For example, when an input of a specific product purchase or a payment request occurs, the payment processing processor 230 may perform a control to output a specified application identifier. During this operation, the payment processing processor 230 may transmit product information (for example, a product type and a product amount) of a corresponding product and payment request information including an application identifier.

When receiving payment related information from the electronic device 100, the payment processing processor 230 may deliver corresponding payment related information to a specific server. For example, the payment processing processor 230 may deliver payment related information to the relay server 410 or the purchase server 430. During this operation, the payment processing processor 230 may deliver payment related information received from the electronic device 100 to a specific server according to a setting or policy. Alternatively, the payment processing processor 230 may extract payment information and additional service information from the received payment related information. The payment processing processor 230 may deliver the extracted payment information and additional service information to a specific server.

According to various embodiments of the present disclosure, the payment processing processor 230 may process additional list delivery. For example, the payment processing processor 230 may include a specified additional list in payment request information and transmit it during a process for transmitting payment request information including an application identifier. The additional list, for example, may include additional service information that is applicable in relation to the reader device 200 or a corresponding product. Moreover, although it is described above that the payment processing processor 230 transmits payment request information including an application identifier, product information, store information, and an additional list, various embodiments of the present disclosure are not limited thereto. For example, the payment processing processor 230 may first transmit an application identifier and if a specified signal from the electronic device 100 that receives the application identifier has replied, transmit at least one of product information, store information, and an additional list.

As mentioned above, a reader device according to an embodiment of the present disclosure may include a memory (for example, a second memory) for storing at least one instruction and a payment processing processor for processing the at least one instruction, and the at least one instruction may be set to perform transmitting, by the payment processing processor, payment request information for requesting payment application execution and receiving payment related information including payment information and additional service information from an electronic device.

According to various embodiments of the present disclosure, the payment processing processor may extract the payment information and the additional service information from the payment related information and provide the extracted information to a relay server.

According to various embodiments of the present disclosure, the payment processing processor may establish a security channel with the electronic device and perform at least one of the transmission of the payment request information and the reception of the payment related information based on the security channel. The payment processing processor may decrypt payment related information received through the security channel and provide decrypted payment information and additional service information to a relay server.

According to various embodiments of the present disclosure, the payment processing processor may transmit an additional list relating to a product to be paid.

As mentioned above, a reader device operating method according to an embodiment of the present disclosure may include transmitting payment request information for requesting payment application execution and receiving payment related information including payment information and additional service information.

Figure 6:
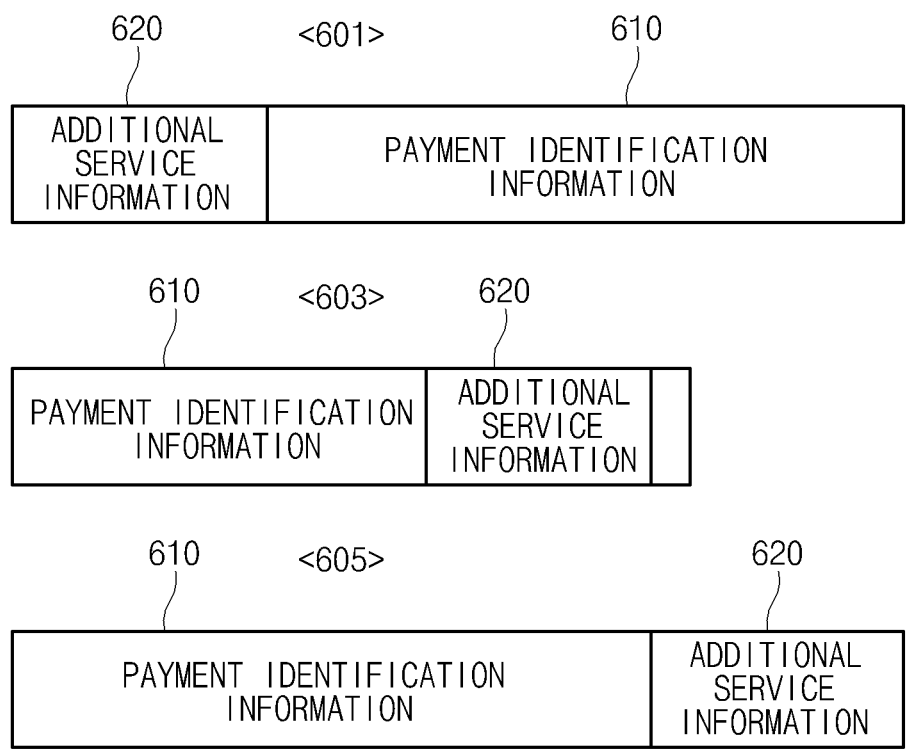
FIG. 6 is a view illustrating various forms of payment related information according to an embodiment of the present disclosure.

FIG. 6 is a view illustrating various forms of payment related information according to an embodiment of the present disclosure.

Referring to FIG. 6, as shown in a structure 601, payment related information may have a form in which additional service information 620 is disposed at the front end of a packet of payment identification information 610 and the payment identification information 610 is disposed at the rear end of a packet of the additional service information 620. The size of the additional service information 620 may have a specified size (for example, 2 bits or a specified bit). The front end of the additional service information 620 may include a flag value for indicating additional service information. Alternatively, an identification value for indicating payment related information including the additional service information 620 may be disposed at the front end of the additional service information 620. According to various embodiments of the present disclosure, the payment related information may be provided without defining an additional header value. In this case, the reader device 200 may read a packet received from the electronic device 100 according to a specified protocol and perform the identification of the additional service information 620 or the payment identification information 610 according to a read position.

As shown in a structure 603, payment related information may have a form in which additional service information 620 is disposed at the middle end of a packet (or an area defined in the payment identification information 610) and the payment identification information 610 is disposed at the front end of the additional service information 620. The middle end of a packet where the additional service information 620 is disposed may be a preliminary area. The additional service information 620, as described above, may include at least one of information automatically written by the electronic device 100, information written according to a user setting, and information written according to a user selection.

As shown in a structure 605, payment related information may have a form in which additional service information 620 is disposed at the rear end of a packet and payment identification information 610 is disposed at the front end of the additional service information 620.

Additionally or alternatively, payment related information may include header information. The header information may include information on the position and size of the additional service information 620. For example, as included in the packet of the structure 610, a header may have a value for indicating that the header is disposed at the front end of the additional service information 620 and a corresponding packet is in the order at which the additional service information 620 and the payment identification information 610 are disposed sequentially. Alternatively, the header may include a bit address value where the additional service information 620 is written. According to various embodiments of the present disclosure, when the position and size of the additional service information 620 in payment related information is pre-defined according to protocol definition, header information may be omitted.

FIG. 7 is a view illustrating one form of payment identification information according to an embodiment of the present disclosure.

Referring to FIG. 7, the payment identification information, for example, may include a BIN area, a first preliminary field area, a card company generation arbitrary number area, a preliminary code area, and a second preliminary field area. Herein, the BIN area, the first preliminary field area, and the card company generation arbitrary number area may correspond to an app card dedicated card number area. Additionally, the preliminary code area and the second preliminary field area may correspond to an alliance service area. The first preliminary field area may be disposed between the BIN area and the card company generation arbitrary number area and the preliminary code area may be disposed between the card company generation arbitrary number area and the second preliminary field area.

FIG. 8 is a view illustrating a data value of payment identification information according to an embodiment of the present disclosure.

Referring to FIG. 8, BIN may have a 6-bit length. The BIN may mean a number allocated to a card company. The first preliminary field may be expressed with a 1-bit value.

The first preliminary field may be set to "0" by default and may be used when the BIN area uses 7 digits or the card company generation area expands. The card company generation arbitrary number may have a 9-bit length. The card company generation arbitrary number may mean arbitrary number information generated by a card company. For example, the card company generation arbitrary number may include OTC information. The card company generation arbitrary number may include token information.

The preliminary code may have a 4-bit length. The second preliminary field may have a 1-bit length. The preliminary code and the second preliminary field may be used when alliance service is required and may be set to "0" by default when not in use.

FIG. 9 is a view illustrating one form of additional service information according to an embodiment of the present disclosure.

Referring to FIG. 9, the additional service information may be information created and written by an electronic device. The additional service information, as described above, may be disposed on at least one of the front end of payment identification information, the rear end of payment identification information, and a preliminary code area.

According to an embodiment of the present disclosure, the additional service information, as shown in the drawing, may include a tag item, a length item, and a value description item. Additional service information may belong to A1 in a tag item and its length may include a payment transaction data template item of a variable length var.

In relation to the payment transaction data template item, Tag B1 having a variable length may mean payment information (for example, OTC for App Card-Numeric string). Tag C1 having a variable length may mean Membership coupon service in additional service information. In relation to additional service information that defines membership service information, at least one tag item may be defined additionally. A Tag C2 item having a variable length may mean Merchant stamp service in additional service information. Additional service information that defines merchant stamp service may further include more various tag items. Additionally, tag items that define the additional service information may be defined according to NFC tag specifications. Additionally, the additional service information may further include code information for indicating additional service.

Figure 10:
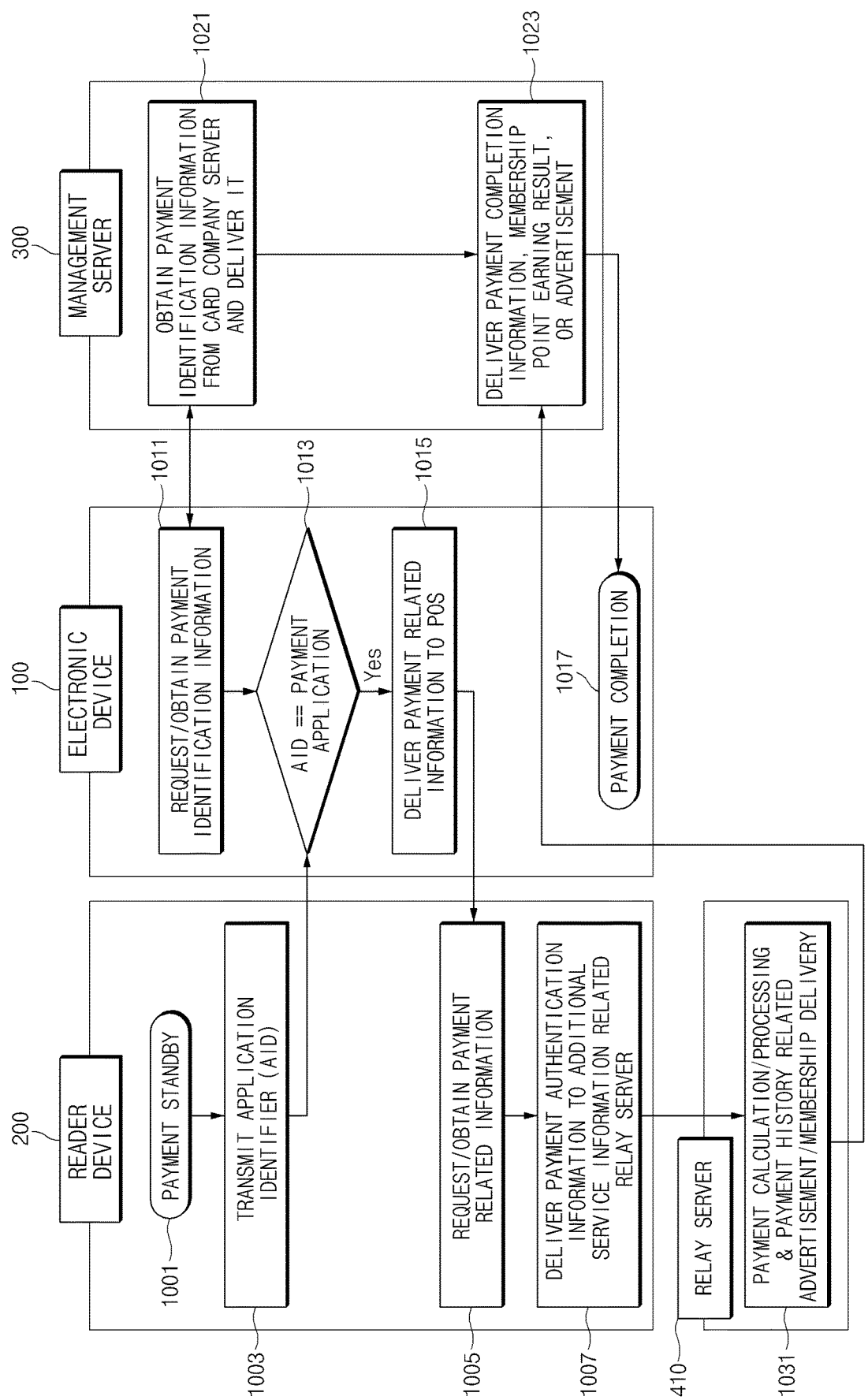
FIG. 10 is a view illustrating an operation of some devices relating to payment related information processing according to an embodiment of the present disclosure.

FIG. 10 is a flowchart illustrating an operation of some devices relating to payment related information processing according to an embodiment of the present disclosure.

Referring to FIG. 10, a reader device 200 may perform payment preparation in operation 1001. During this operation, the reader device 200 may be in a state that a program relating to at least one payment processing is installed to transmit a specific application identifier. The reader device 200 may receive a payment request related input, for example, and also receive a product registration or selection related input. When a payment request input occurs, in operation 1003, the reader device 200 may transmit an application identifier. The application identifier may be a payment application that is to be executed on the electronic device 100 in order to a specified payment. Together with application identifier transmission or after application identifier transmission, the reader device 200 may provide payment information (for example, information such as the type of a product, the price of a product, and so on) to the electronic device 100.

In correspondence to application identifier transmission, in operation 1005, the reader device 200 may receive payment related information including additional service information and payment identification information (for example, one-time token information) from the electronic device 100. The reader device 200 may extract additional service information from payment related information received from the electronic device 100. In operation 1007, the reader device 200 may deliver payment identification information to a service available relay server 410 (for example, a VAN server) in correspondence to the extracted additional service information. During this operation, the reader device 200 may provide payment amount related information and additional service information processing related card information to the relay server 410.

In operation 1011, the electronic device 100 may request payment identification information from the management server 300 and collect corresponding payment identification information. According to various embodiments of the present disclosure, the electronic device 100 may request payment identification information from the card company server 440 and directly receive payment identification information from the card company server 440. The electronic device 100 may operate a security channel in relation to payment identification information transmission/reception. For example, the electronic device 100 may establish a channel having security characteristics with the management server 300, and request and obtain payment identification information based on a corresponding security channel.

In operation 1013, the electronic device 100 may check whether an application identifier received from the reader device 200 is a specified payment application. If the application identifier is not a specified payment application, error processing may be performed or payment may be made based on another payment processing method. For example, when the received application identifier does not relate to a payment application operation, the electronic device 100 may authenticate payment information received from the reader device 200 and deliver the authentication information to the reader device 200 according to a P2P method. According to an embodiment of the present disclosure, when a received application identifier is not a payment application operation, the NFC control module (for example, the payment processing module 180) may perform payment processing in a form of transmitting information to the reader device by performing specified authentication processing based on a specified security storage (for example, eSE) according to a P2P method. In the case of an application identifier relating to a specified payment application, in operation 1015, the electronic device 100 may deliver additional service information and payment identification information to the reader device 200 (for example, a POS device). When receiving payment completion information, a membership point earning result, and advertisement from the management server 300, the electronic device 100 may perform payment completion processing in operation 1017.

In operation 1021, the management server 300 may obtain payment identification information from the card company server 440 and deliver it. In relation to this, the management server 300 may receive a payment identification information request from the electronic device 100. The management server 300 may determine which card company server 440 it is to access by checking the payment identification information request received from the electronic device 100. The management server 300 may provide information relating to the electronic device 100 to a corresponding card company server 440 and receive payment identification information from the card company server 440. During this operation, the management server 300 may check the validity of a payment identification information request received from the electronic device 100. In relation to this, the electronic device 100 may provide, to the management server 300, information (for example, expiration date information, specified unique identification information, and so on) for checking validity when a payment identification information is requested. When payment identification information is received from the card company server 440, the management server 300 may deliver it to the electronic device 100.

In operation 1023, the management server 300 may deliver payment completion information, a membership point earning result, and advertisement to the electronic device 100. During this operation, the management server 300 may deliver a corresponding advertisement to an advertisement application of the electronic device 100. The advertisement, as an advertisement according to an additional service information operation, may be information received from the additional information server 450.

When receiving payment identification information from the reader device 200, in operation 1031, the relay server 410 may check the validity of the electronic device 100 based on the received payment identification information and perform payment calculation/processing, and deliver payment history related advertisement/membership to the management server 300. During this operation, the relay server 410 may transmit/receive payment related information to/from the card company server 440 in order for payment calculation/processing. Additionally the relay server 410 may transmit/receive related information to/from the additional information server 450 in order for payment history related advertisement/membership processing.

Figure 11:
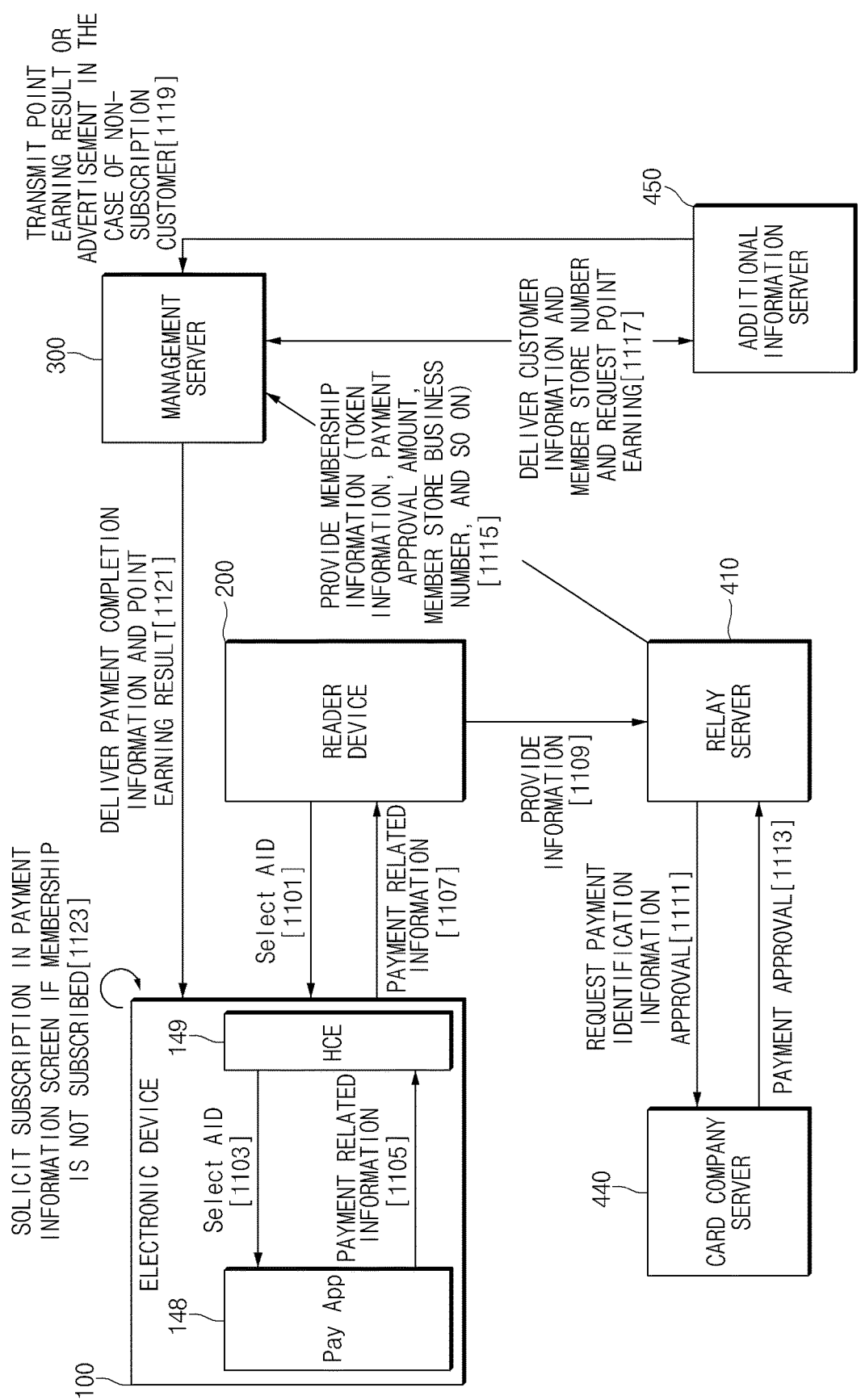
FIG. 11 is a view illustrating a signal flow between devices relating to payment related information processing according to an embodiment of the present disclosure.

FIG. 11 is a view illustrating a signal flow between devices relating to payment related information processing according to an embodiment of the present disclosure.

Referring to FIG. 11, in operation 1101, the reader device 200 may transmit an application identifier relating to NFC payment. The electronic device 100 may be disposed close to the reader device 200 within a specified distance and receive a selection application identifier transmitted from the reader device 200. As one example, when receiving a selection application identifier signal transmitted from the reader device 200 is received, a payment operation processor of the electronic device 100, for example, a host card emulator 149, may check the type of the received application identifier. When the selection application identifier is information relating to an operation of the payment application 148, the host card emulator 149 may deliver it to the processor 120. The processor 120 may communicate with the host card emulator 149 by executing the payment application 148 corresponding to the selection application identifier.

In operation 1103, the payment application 148 of the electronic device 100 may receive a selection application identifier from the host card emulator 149. In operation 1105, the payment application 148 may generate payment related information according to a specified setting and deliver it to the host card emulator 149. For example, the payment application 148 may deliver payment related information including specified additional service information and payment identification information to the host card emulator 149. During this operation, the payment application 148, as described above, may write at least one additional service information to be included in payment related information in correspondence to various states. Alternatively, the payment application 148 may write guide information on an additional service information non-written state to be included in payment related information.

In operation 1107, the host card emulator 149 of the electronic device 100 may deliver payment related information to the reader device 200. When receiving payment related information from the electronic device 100, in operation 1109, the reader device 200 may deliver corresponding information to the relay server 410 (for example, VAN).

In operation 1111, the relay server 410 may request approval from the card company server 440 based on payment identification information (for example, token information or OTC information) from the received information. In operation 1113, the card company server 440 may check the validity of the received payment identification information and provide the payment approval according to the approval request to the relay server 410.

In operation 1115, the relay server 410 may provide membership information to the management server 300. The membership information, for example, may include token information, a payment approval amount, and a member store business number. Additionally, the membership information may include membership card information. Alternatively, the membership information may include type information of a membership card or user information. Information relating to the membership card may be stored and managed by a customer server.

In operation 1117, the management server 300 may perform a point earning request by delivering customer information and a member store number to the additional information server 450. In relation to this, the management server 300 may store and manage user information relating to membership information received from the relay server 410. For example, the management server 300 may store and manage identification information of the electronic device 100, card information operating in the electronic device 100, and user information (for example, name, age, and job) of the electronic device 100. The management server 300 may store and manage membership card information, a coupon issue number, and discount card information of a specified user (or a user subscribed to the management server 300). The management server 300 may store and manage information relating to an additional service information operation and when additional service information processing is requested from the relay server 410, write a corresponding request processing related message (for example, a message including membership card information, customer information, payment amount information, and store information) and deliver it to the additional information server 450.

In operation 1119, the additional information server 450 may deliver a point earning result to the management server 300. Alternatively, in the case of a non-subscribed customer, the additional information server 450 may provide a specified advertisement to the management server 300. The advertisement, for example, may include advertisement information for guiding a specified membership card subscription. Alternatively, the advertisement may include coupon information. Alternatively, the advertisement may include information for guiding a specified product.

In operation 1121, the management server 300 may deliver payment completion information and a point earning result to the electronic device 100. The electronic device 100 may output the payment completion information and the point earning result. Moreover, in operation 1123, when receiving advertisement information according to membership non-subscription, the electronic device 100 may output subscription solicitation related information to a payment information screen. The subscription solicitation related information may be information included in an advertisement provided from the additional information server 450.

Figure 12:
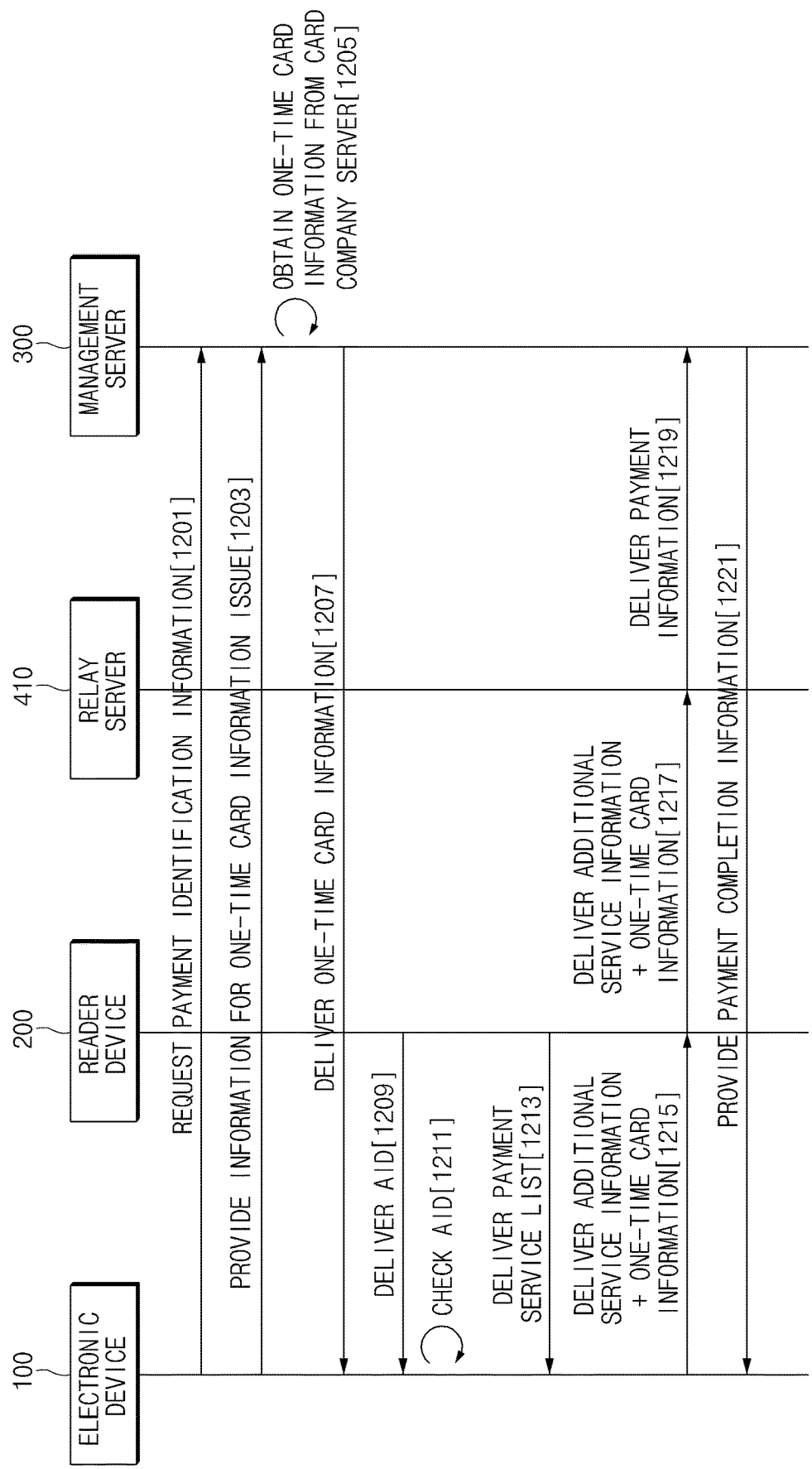
FIG. 12 is a view illustrating a signal flow a payment related information processing system according to an embodiment of the present disclosure.

FIG. 12 is a view illustrating a signal flow of a payment related information processing system according to an embodiment of the present disclosure.

Referring to FIG. 12, in relation to payment related information processing, in operation 1201, an electronic device 100 may request payment identification information from a management server 300. In operation 1203, the electronic device 100 may provide payment identification information, for example, information for one-time card information issue, to the management server 300. For example, the electronic device 100 may provide specific information (for example, card information) used for identification information or a payment identification information request, to the management server 300. In operation 1205, the management server 300 may obtain one-time card information from the card company server 440. In relation to this, the management server 300 may provide, to the card company server 440, specific information used for the payment identification information request provided from the electronic device 100. In operation 1207, the management server 300 may deliver the received payment identification information to the electronic device 100. The payment identification information, for example, may be one-time card information or token information. The token information, for example, may be information that is restricted by at least one of a usage time and the number of times of request. According to an embodiment of the present disclosure, the token information may include OTC information. The token information, for example, may be received from an external server (for example, a management server and a card company server).

In operation 1209, the reader device 200 may perform the delivery of an application identifier. In relation to this, the reader device 200 may transmit an application identifier to a specified electronic device 100 in correspondence to an administrator input control. The application identifier, for example, may be information for requesting the execution of a payment application installed on the electronic device 100. Additionally or together with the transmission of the application identifier, the reader device 200 may transmit payment request information including product information, store information, and payment amount information.

In operation 1211, the electronic device 100 may check an application identifier provided from the reader device 200. The electronic device 100 may operate a payment application corresponding to an application identifier. In operation 1213, the reader device 200 may deliver a payment service list to the electronic device 100. According to an embodiment of the present disclosure, the payment application may request a payment service list from the reader device 200. Correspondingly, the reader device 200 may provide a payment service list to the electronic device 100. During this operation, the payment application may provide, to the reader device 200, an additional service information type including additional service information (for example, membership card information, coupon information, discount card information, and so on) stored in a memory. The reader device 200 may configure a payment service list including payment service items corresponding to the received additional service information type of the electronic device 100 and provide it to the electronic device 100. When the payment service list is received, the electronic device 100 may generate payment related information by selecting additional service information that satisfies a specified condition from additional service information included in the payment service list. In the case of membership cards of the same type, the specified condition, for example, may be a card having a relatively high point earning. Alternatively, in the case of membership cards of the same type, the specified condition, for example, may be a relatively frequently used card or a recently used card. Alternatively, a specified condition may be a condition for selecting a card having a relatively high score (for example, a higher one among a score of an amount obtained by converting points and a score of a discounted amount) by comparing a membership point earning card and a discount card. Alternatively, a specified condition may be a condition according to the expiration date of coupon information (for example, a condition selected as top priority when the expiration date is less than a specified period).

When the payment related information is written, the electronic device 100 may provide it to the reader device 200 in operation 1215. In operation 1217, the reader device 200 may deliver the received payment related information to the relay server 410. In operation 1219, the relay server 410 may deliver the payment information to the management server 300. The management server 300 may process payment approval by transmitting/receiving the received payment information to/from the card company server 440. During this operation, the management server 300 may receive a payment processing result according to the payment approval from the card company server 440. In operation 1221, the management server 300 may provide payment completion information to the electronic device 100.

Figure 13:
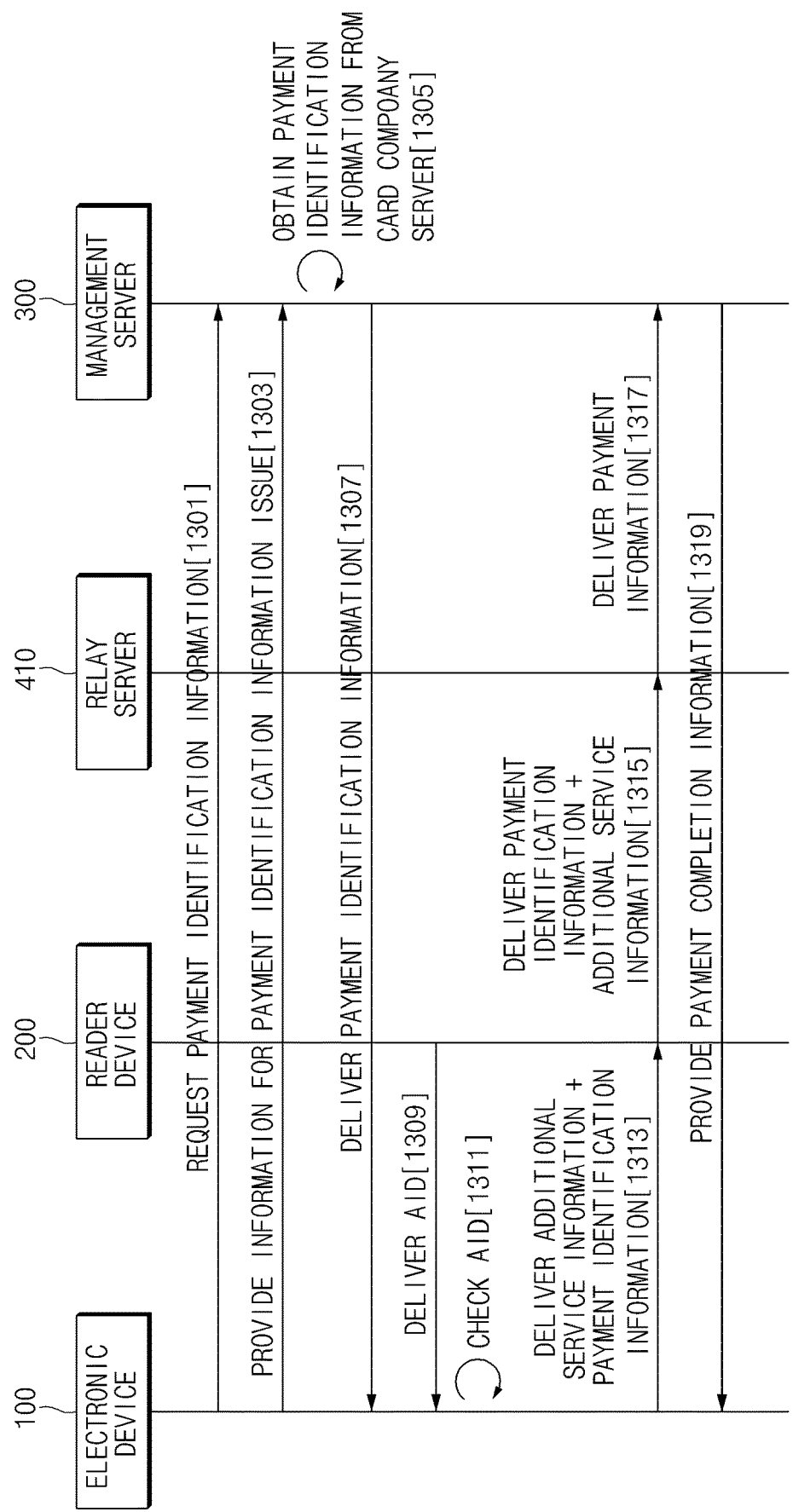
FIG. 13 is a view illustrating a signal flow a payment related information processing system according to another embodiment of the present disclosure.

FIG. 13 is a view illustrating a signal flow of a payment related information processing system according to another embodiment of the present disclosure.

Referring to FIG. 13, in relation to payment related information processing, in operation 1301, an electronic device 100 may request payment identification information from a management server 300. Additionally, in operation 1303, the electronic device 100 may provide information for one-time card information issue to the management server 300. In operation 1305, the management server 300 may obtain one-time card information from the card company server 440. In operation 1307, the management server 300 may provide the obtained one-time card information to the electronic device 100.

In operation 1309, the reader device 200 may perform the delivery of an application identifier. The electronic device 100 may check the received application identifier in operation 1311 and generate payment related information. The payment related information, for example, may be information including at least one additional service information. In operation 1313, the electronic device 100 may deliver payment related information to the reader device 200.

In operation 1315, the reader device 200 may deliver one-time card information and service information to the relay server 410. During this operation, the reader device 200 may extract code information included in the payment related information and check additional service information corresponding to the extracted code information. In relation to this, the reader device 200 may store and manage the code information and a service information mapping table.

In operation 1317, the relay server 410 may deliver the payment information to the management server 300. The payment information, for example, may include one-time card information and a processing result of service information. Alternatively, the relay server 410 may obtain a payment processing result based on one-time card information through the transmission/reception with the card company server 440. The relay server 410 may provide service information to the management server 300 and the management server 300 may deliver the service information to the additional information server 450 to obtain an additional service information processing result. Alternatively, the relay server 410 may deliver the service information to the additional information server 450 and obtain an additional service information processing result from the additional information server 450. The relay server 410 may provide payment information including the obtained payment processing result and additional service information processing result to the management server 300. In operation 1319, the management server 300 may provide payment completion information to the electronic device 100.

Figure 14:
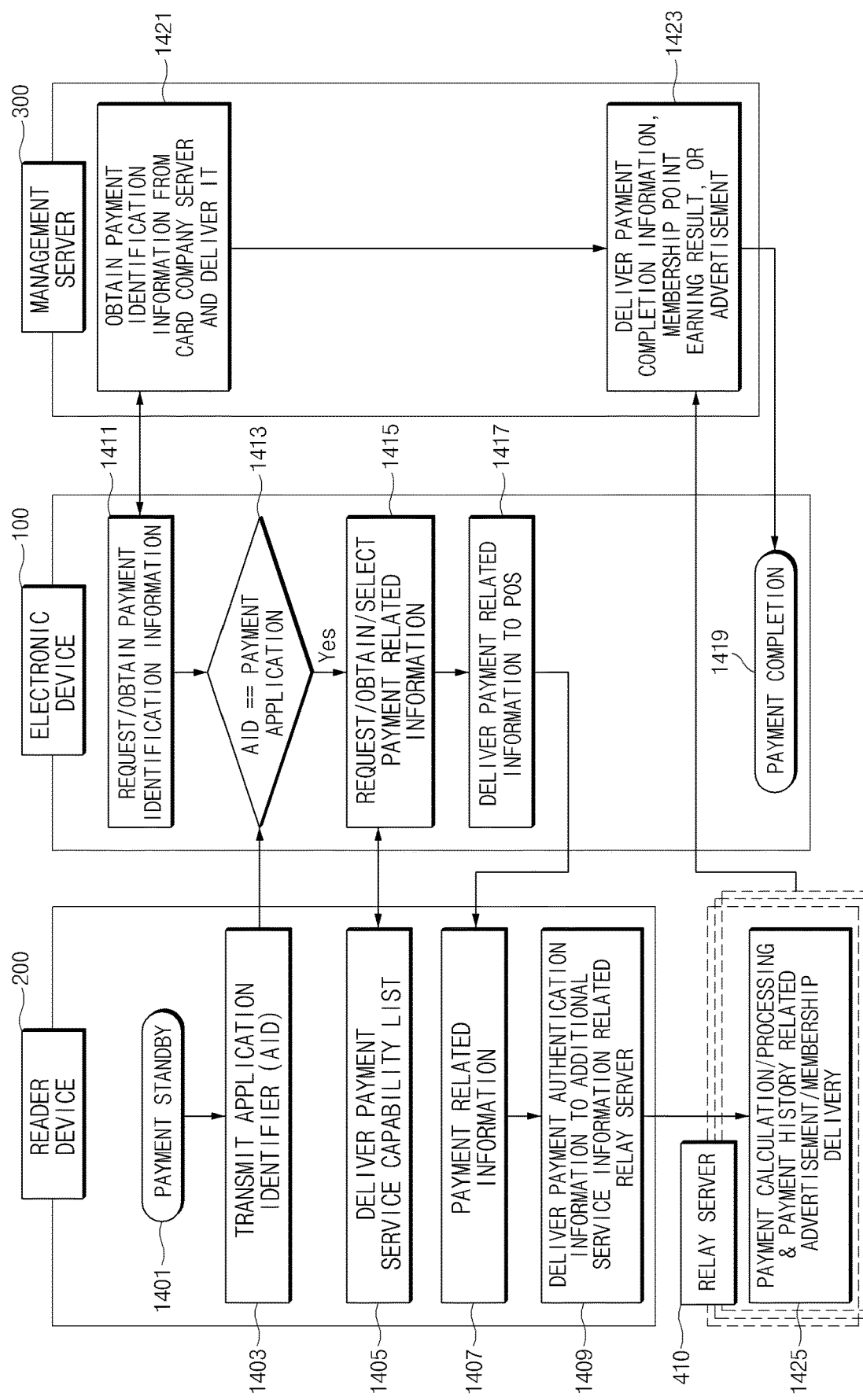
FIG. 14 is a view illustrating an operation of some devices relating to payment related information processing according to another embodiment of the present disclosure.

FIG. 14 is a view illustrating an operation of some devices relating to payment related information processing according to another embodiment of the present disclosure.

Referring to FIG. 14, in relation to payment related information processing, in operation 1401, a reader device 200 may perform payment preparation. For example, the reader device 200 may operate a payment performance program and have a state such as product registration and product selection. When a specified input event occurs, in operation 1403, the reader device 200 may perform the transmission of an application identifier. In operation 1405, after transmitting an application identifier, the reader device 200 may deliver an additional list (for example, a payment service operation list (for example, a capability list) to the electronic device 100. In operation 1407, the reader device 200 may receive payment related information from the electronic device 100. In operation 1409, the reader device 200 may deliver payment identification information to an additional service information related relay server.

In operation 1411, the electronic device 100 may request payment identification information from the management server 300 and obtain it. In operation 1413, when receiving an application identifier transmitted from the reader device 200, the electronic device 100 may check whether a corresponding application identifier is a specified payment application. In operation 1415, the electronic device 100 may perform at least one of an additional list request, acquisition, and selection through the reader device 200. During this operation, the electronic device 100 may automatically select additional service information by comparing additional items included in the additional list with a specified condition. When additional service information is selected, in operation 1417, the electronic device 100 may deliver payment related information including additional service information to the reader device 200 (for example, a POS device). When receiving payment completion information from the management server 300, the electronic device 100 may process the payment completion in operation 1419. The electronic device 100 may terminate the payment application according to payment completion processing. According to the payment completion processing, the electronic device 100 may output at least one of a payment processing result and an additional service information processing result to a display.

In operation 1421, the management server 300 may obtain payment identification information from the card company server 440 and deliver it to the electronic device 100. In operation 1423, the management server 300 may deliver payment completion information, a membership point earning result, and an advertisement to the electronic device 100. The management server 300 may receive payment completion information, a membership point earning result, and advertisement from the relay server 410.

In operation 1425, when receiving payment related information from the reader device 200, the relay server 410 may collect payment calculation/processing, payment history related advertisement/membership information based on payment information and additional service information included in corresponding information. The relay server 410 may deliver the collected payment calculation/processing and advertisement/membership information to the management server 300.

Figure 15:
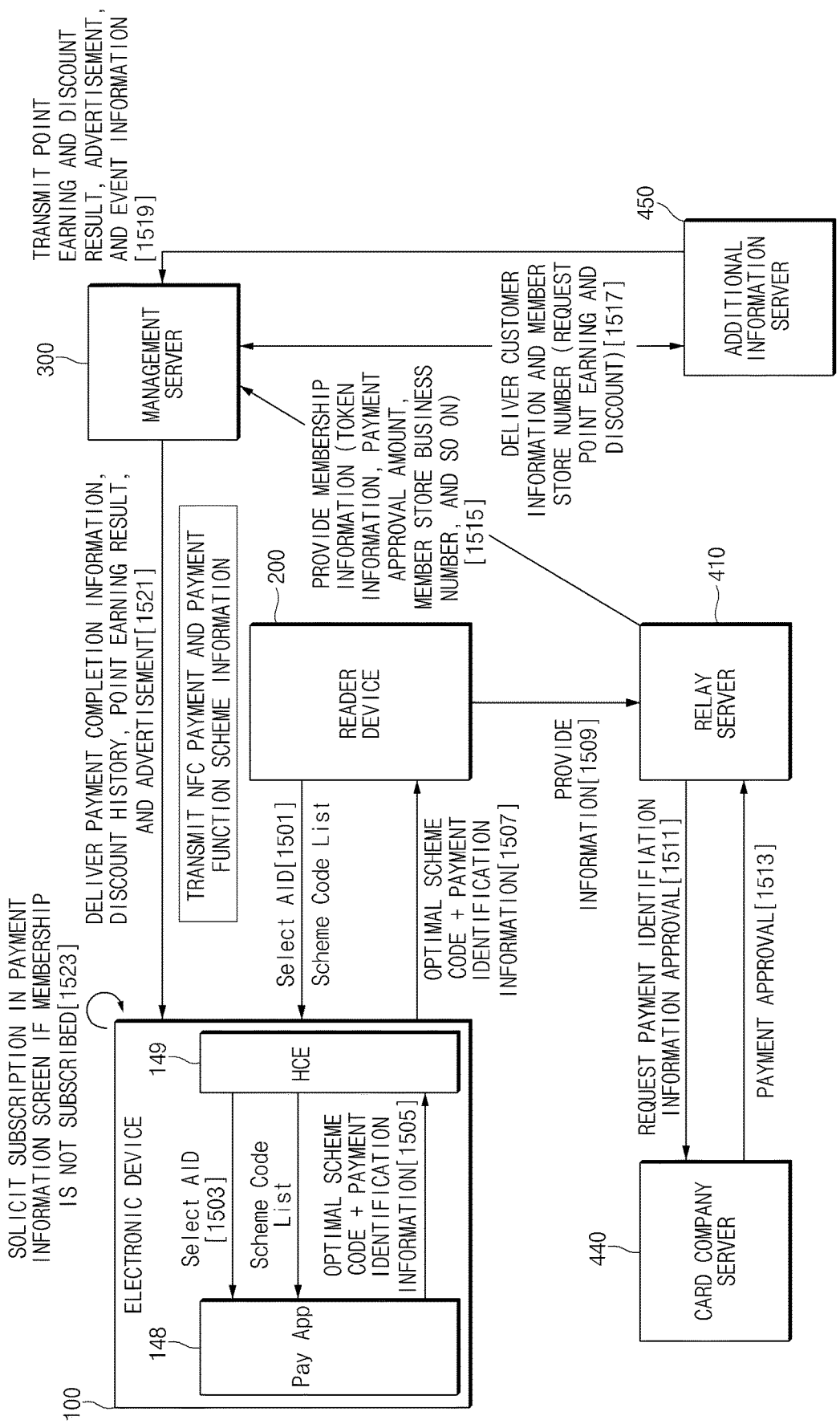
FIG. 15 is a view illustrating a signal flow between devices relating to payment related information processing according to another embodiment of the present disclosure.

FIG. 15 is a view illustrating a signal flow between devices relating to payment related information processing according to another embodiment of the present disclosure.

Referring to FIG. 15, in relation to payment related information processing, in operation 1501, the reader device 200 may deliver a selection application identifier and an additional list (for example, a scheme code list) to a payment operation processor of the electronic device 100, for example, a host card emulator 149. In operation 1503, the host card emulator 149 may deliver a selection application identifier to the processor 120 to execute a specified payment application 148. When the payment application 148 is executed, the host card emulator 149 may deliver an additional list (for example, a scheme code list) to the payment application 148. The payment application 148 may check additional service information included in the received additional list (for example, a scheme code list) and select additional service information used in relation to the current product purchase or payment. The payment application 148 may deliver, to the host card emulator 149, payment related information including additional service information code (for example, Optimal Scheme Code) corresponding to the selected additional service information, SEC, and payment identification information in operation 1505. The SEC may be a value for indicating whether there is additional service information.

The host card emulator 149 may deliver, to the reader device 200, payment related information including additional service information code (for example, Optimal Scheme Code), SEC, and payment identification information in operation 1507. The reader device 200 may deliver the received payment related information to the relay server 410 in operation 1509. During this operation, the reader device 200 may deliver information, which is obtained by extracting additional service information code and payment identification information, to the relay server 410. The payment identification information may include information such as card information, payment account information, and a product type for payment. In operation 1511, the relay server 410 may request a payment identification information approval from the card company server 440 based on the received information. In operation 1513, when a corresponding approval request is legitimate, the card company server 440 may provide a payment approval to the relay server 410. In operation 1515, the relay server 410 may provide membership information to the management server 300. The membership information, for example, may include token information, a payment approval amount, and a member store business number. In operation 1517, the management server 300 may request membership point earning and discount while delivering customer information and a member store number to the additional information server 450. The additional information server 450 may perform point earning or discount processing based on a specified membership card, discount card, or coupon according to a request of the management server 300. In operation 1519, the additional information server 450 may transmit a point earning and discount result and advertisement and event information to the management server 300. In operation 1521, the management server 300 may deliver payment completion information, a discount history, a point earning result, and advertisement to the electronic device 100. In operation 1523, the electronic device 100 may output subscription solicitation information to a payment information screen when membership is not subscribed. When membership is subscribed, the received payment processing result and additional service information processing result may be stored or displayed.

Figure 16A:
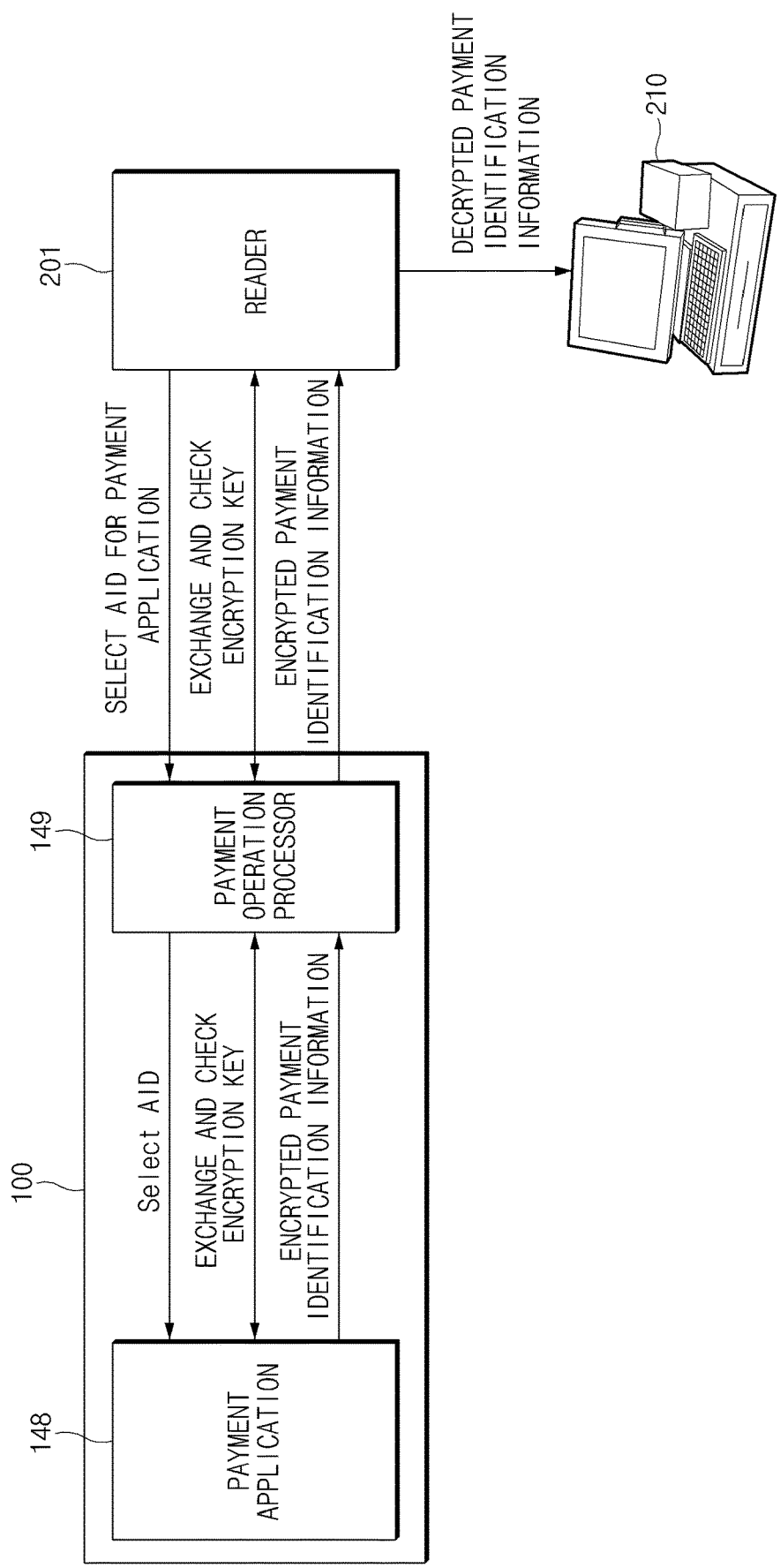
FIG. 16A is a view illustrating a payment related information encryption operation according to an embodiment of the present disclosure.

FIG. 16A is a view illustrating a payment related information encryption operation according to an embodiment of the present disclosure.

Referring to FIG. 16A, in relation to a payment related information encryption operation, an electronic device 100 may establish a security channel with a reader 201 (e.g., reader device 200). For example, the reader 201 may deliver a selection application identifier for a specified payment application to a payment operation processor 149 (for example, the host card emulator). The payment operation processor 149 may deliver a selection application identifier provided from the reader 201 to the payment application 148. The payment application 148 may exchange and check a specified encryption key with the payment operation processor 149. When the exchange and check of the specified encryption key are completed, the exchange and check between the payment operation processor 149 and the reader 201 may be performed.

According to the reception of a selection application identifier, the payment application 148 may deliver, to the payment operation processor 149, payment related information (for example, token information and encrypted OTC 21-digit information) including additional service information. The payment operation processor 149 may deliver payment related information (for example, encrypted information), which is received from the payment application 148, to the reader 201. The reader 201 may decrypt the encrypted payment related information. The reader 201 may deliver the decrypted payment identification information to a POS device 210. Herein, the reader 201, for example, may be an NFC reader. The reader 201 and the POS device 210 may correspond to a reader device.

Figure 16B:
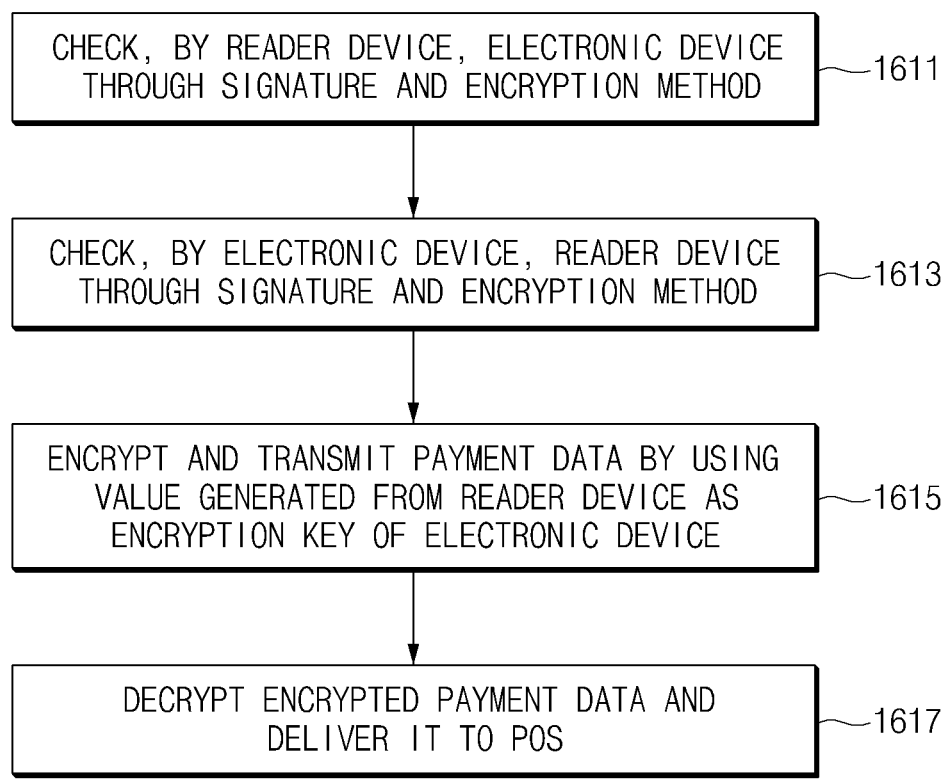
FIG. 16B is a view illustrating encrypted payment related information processing according to an embodiment of the present disclosure.

FIG. 16B is a flowchart illustrating encrypted payment related information processing according to an embodiment of the present disclosure.

Referring to FIG. 16B, a reader device 200 may check an electronic device 100 through a signature and encryption method in operation 1611. For example, a reader of the reader device 200 may transmit/receive a signal for checking the electronic device 100 through a specified signature and encryption method in correspondence to a control of a mounted control module. Correspondingly, in operation 1613, the electronic device 100 may check the reader device 200 through a signature and encryption method.

In operation 1615, the reader of the reader device 200 may perform payment data encryption and transmission by using a value generated from the reader device 200 in relation to payment as an encryption key of the electronic device 100. For example, the reader of the electronic device 200 may receive payment data encrypted using the encryption key from the electronic device 100. In operation 1617, the reader of the reader device 200 may decrypt the encrypted payment data and deliver it to a POS device. The decrypted payment data may be provided to a relay server.

Figure 16C:
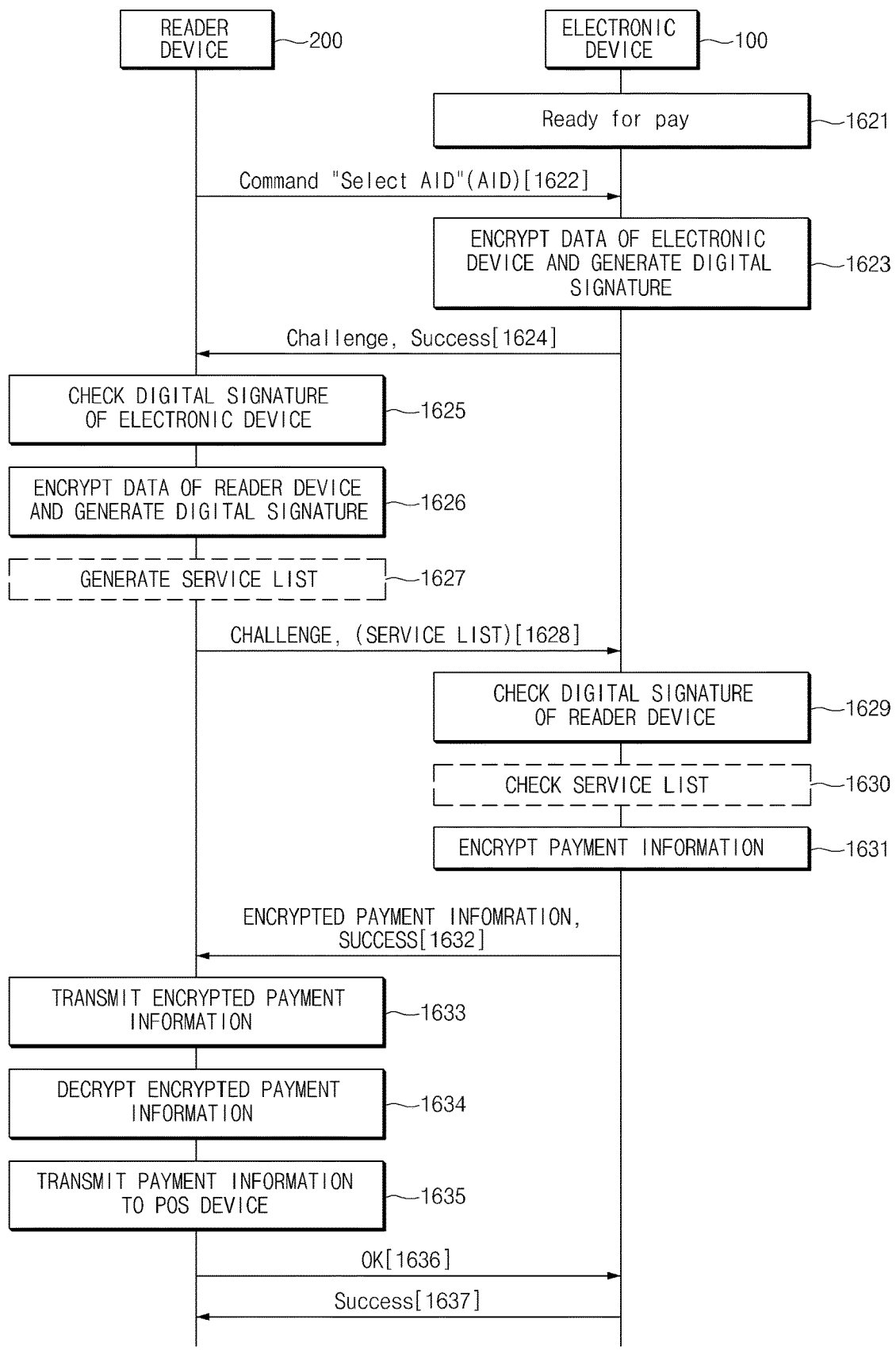
FIG. 16C is a view illustrating an encrypted payment processing process according to an embodiment of the present disclosure.

FIG. 16C is a view illustrating a signal flow of an encrypted payment processing process according to an embodiment of the present disclosure.

Referring to FIG. 16C, an electronic device 100 may have a preparation state for payment in operation 1621. In operation 1622, a reader of the reader device 200 may transmit the Command "Select AID" (AID) message to the electronic device 100.

In operation 1623, the electronic device 100 may perform the data encryption and digital signature generation of an electronic device. During this operation, the electronic device 100 may perform the digital signature generation by using a pre-defined specified value shared by the reader device 200, for example, a pre-shared encryption key. In operation 1624, the electronic device 100 may transmit a Challenge or Success message to the reader of the reader device 200. The Challenge message transmitted from the electronic device 100 may include data encrypted by the electronic device 100 and content of a digital signature generated by the electronic device 100.

In operation 1625, the reader of the reader device 200 may check the digital signature of the electronic device 100. In operation 1626, the reader of the reader device 200 may perform the data encryption and digital signature generation of the reader device. During this operation, the reader of the reader device 200 may perform the digital signature generation by using a pre-defined specified value shared by the electronic device 100, for example, a pre-shared encryption key. Additionally or alternatively, the reader of the reader device 200 may generate a service list (for example, the additional list) in operation 1627. In operation 1628, the reader of the reader device 200 may transmit a Challenge message (for example, a service list) to the electronic device 100. The Challenge message transmitted from the reader of the reader device 200 may include data encrypted by the reader and a digital signature generated by the reader. Additionally, the Challenge message transmitted from the reader may further include a service list.

In operation 1629, the electronic device 100 may check the digital signature of the reader device. Additionally or alternatively, in operation 1630, the electronic device 100 may check a service list. For example, when the reader of the reader device 200 generates and provides a service list and the electronic device 100 is set to check the service list, service list check may be performed. In operation 1631, the electronic device 100 may extract encrypted data from the Challenge message received from the reader device 200. The electronic device 100 may decrypt the encrypted data of the reader device 200 by using a pre-shared encryption key. The electronic device 100 may write payment information by checking the decrypted content. The electronic device 100 may encrypt the payment information by using at least part of encrypted data generated by the reader device 200 as a key. In operation 1632, the electronic device 100 may transmit encrypted payment information and a Success message to the reader of the reader device 200.

In operation 1633, the reader of the reader device 200 may transmit the encrypted payment information. In operation 1634, the reader of the reader device 200 may decrypt the encrypted payment information. In operation 1635, the reader of the reader device 200 may transmit the payment information to a POS device.

In operation 1636, the reader of the reader device 200 may transmit an OK message to the electronic device 100 and in operation 1637, the electronic device 100 may transmit a "Success" message to the reader device 200 (or the reader).

According to an embodiment of the present disclosure, the encryption key may be a value shared by a reader device and an electronic device in advance. Additionally, in order to provide synchronization between a reader device and an electronic device, a corresponding value may be updated periodically in two devices (for example, the reader device and the electronic device).

Figure 16D:
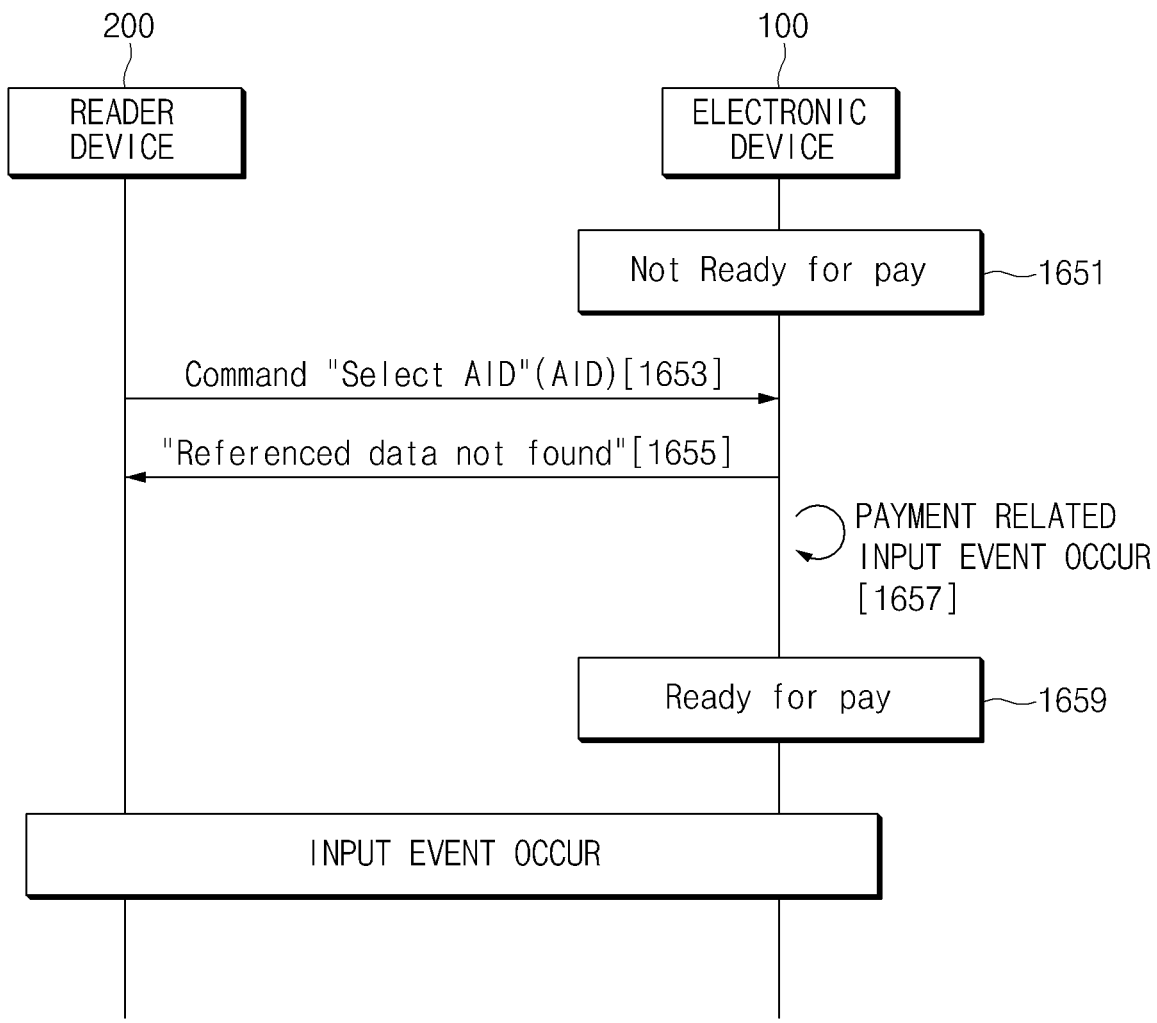
FIG. 16D is a view illustrating a payment standby state entry according to an embodiment of the present disclosure.

FIG. 16D is a view illustrating a signal flow of a payment preparation state entry according to an embodiment of the present disclosure.

Referring to FIG. 16D, an electronic device 100 may be in a not ready for pay state in operation 1651. In operation 1653, a reader device 200 (or a reader thereof) may transmit the Command "Select AID" (AID) message to an electronic device 100.

If the electronic device 100 that receives the Command "Select AID" (AID) message is in a not ready for pay state, in operation 1655, it may provide a "Referenced data not found" message to the reader device 200. During this operation, the electronic device 100 may output a message or pop-up for requesting a specified input event for payment preparation.

When a specified input event for payment preparation occurs in operation 1657, the electronic device 100 may enter a ready for pay state in operation 1657. Then, after entering the ready for pay state, payment processing may be performed through a payment method encrypted according to a method described with reference to FIG. 16C. Alternatively, as described with reference to FIGS. 10 to 15, payment processing may be performed according to a decrypted payment method.

Figure 17:
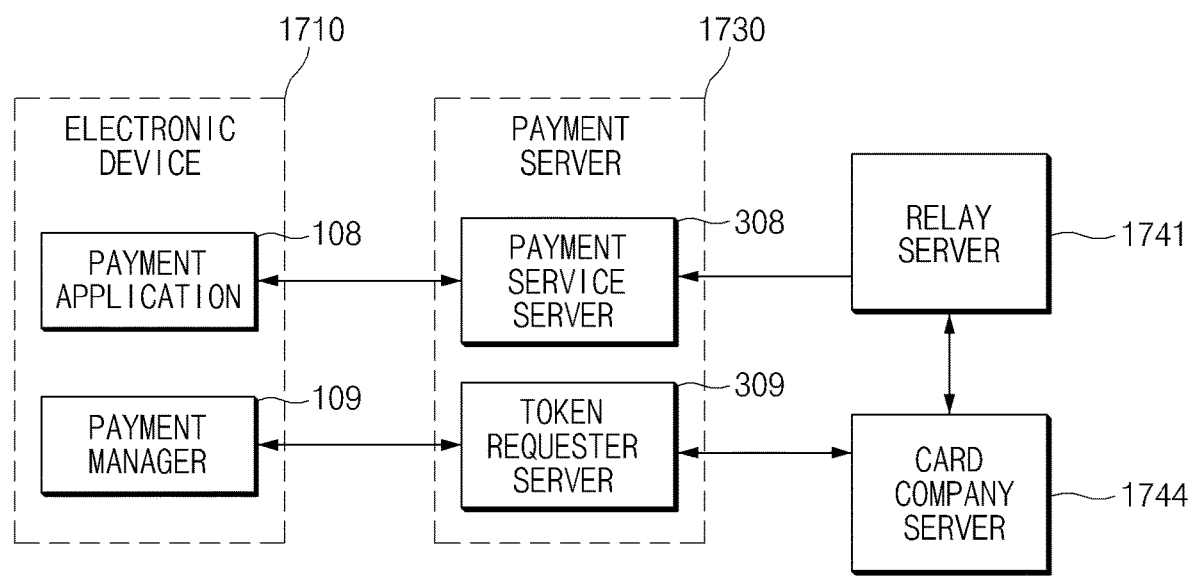
FIG. 17 is a view illustrating a payment related information processing system according to an embodiment of the present disclosure.

FIG. 17 is a view illustrating a payment related information processing system according to an embodiment of the present disclosure.

Referring to FIG. 17, according to an embodiment of the present disclosure, a payment information processing related system may include an electronic device 1710 (for example, the electronic device 100), a payment server 1730 (for example, the management server 300), a relay server 1741 (for example, the relay server 410), and a card company server 1744 (for example, the card company server 440). In relation to such a system, applications between the electronic device 1710 and the payment server 1730 communicate with each other and process payment related information through the relay server 1741.

The electronic device 1710 may include a processor for providing a non-security operation environment and a security operation environment. The electronic device 1710 may include a payment application 108 and a payment manager 109. The payment application 108 may provide a user interface for card registration and payment. The payment manager 109 may provide a function for performing various operations for payment based on a security operation environment.

The payment server 1730 may include a payment service server 308 and a token requester server 309. The payment service server 308 may manage the token requester server 309 based on user account management and the electronic device 1710 may manage the token requester server 309 based on the payment application 108 and communication and web interfaces. The token requester server 309 may perform token management. For example, the token requester server 309 may request, obtain, store, and manage a token.

The relay server 1741 may transmit payment data received from the reader device 200 to the card company server 1744. During this operation, the relay server 1741 may collect and manage sales slips on behalf of each card company and identify card company information from payment data transmitted from the reader device 200 in order to provide the payment data to the corresponding card company server 1744. The relay server 1741, for example, may include a VAN server.

The relay server 1741 may receive payment data and additional service information from the reader device 200 and obtain a payment processing result by providing the payment information to the card company server 1744. Additionally, the relay server 1741 may provide additional service information to a related additional information server 450 and collect an additional service information processing result from the additional information server 450. According to various embodiments of the present disclosure, the relay server 1741 may provide additional service information to the payment server 1730 and allow the payment server 1730 to obtain an additional service information processing result.

The card company server 1744 may include a bank or a card company, which issues a virtual card. The card company server 1744 may perform user authentication on the issued card and token. After the user authentication is completed, the card company server 1744 may support the normal usage of a corresponding card and token.

In relation to the payment related information processing system, the payment application of the electronic device 1710 may communicate with the payment service server 308 of the payment server 1730 and the payment service server 308 may collect data from the relay server 1741 and operate it. The payment manager 109 may communicate with the token requester server 309 of the payment server 1730 and the token requester server 309 may perform payment processing by transmitting/receiving information to/from the card company server 1744. The relay server 1741 and the card company server 1744 may perform a payment approval request and a payment approval by transmitting/receiving information between them.

Figure 18:
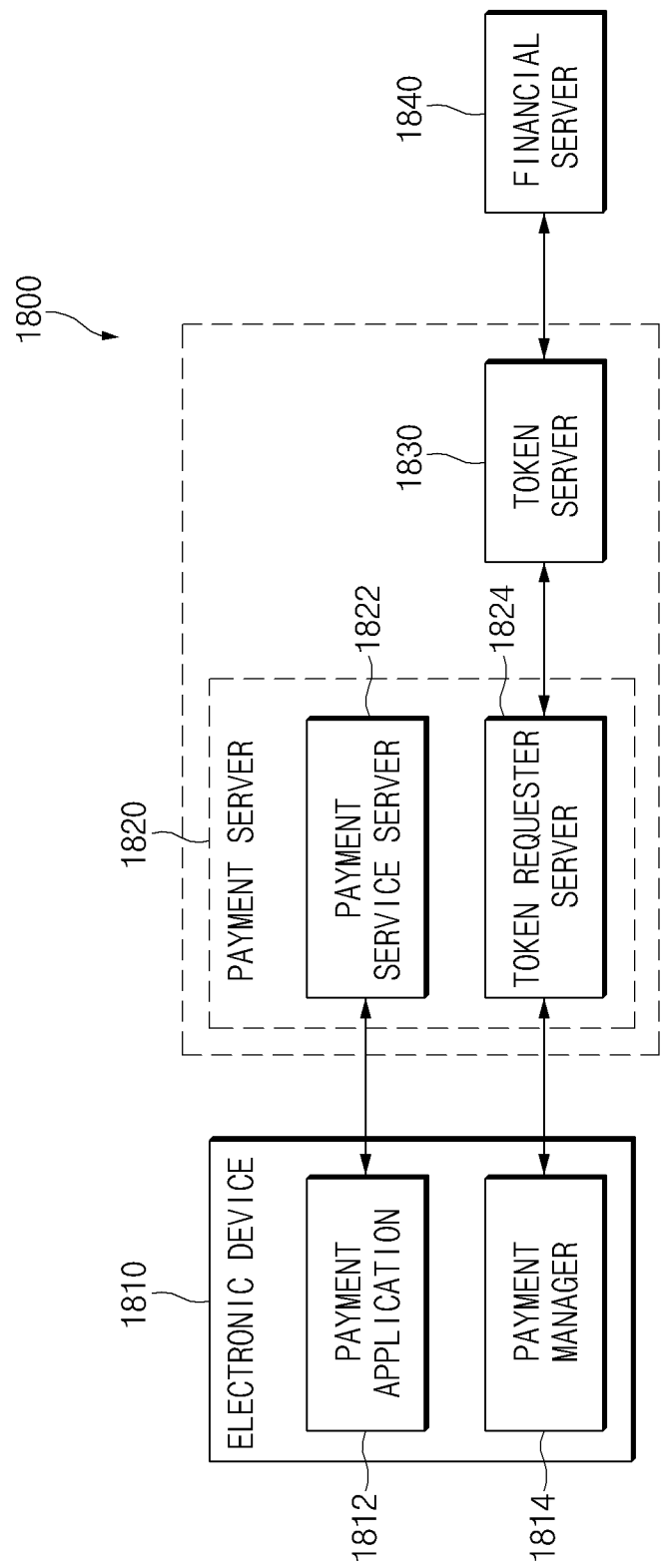
FIG. 18 is a view illustrating a payment related information processing system according to another embodiment of the present disclosure.

FIG. 18 is a view illustrating a payment related information processing system according to another embodiment of the present disclosure.

Referring to FIG. 18, according to an embodiment of the present disclosure, a payment system 1800 for supporting payment related information processing may include an electronic device 1810 (for example the electronic device 100) and/or a server. Additionally, for example, the server may include a payment server 1820 (for example, the management server 300), a token server or a token service provider 1830, or a financial server (for example, an issuer) 1840. The electronic device 1810, for example, may include a payment application (for example, a wallet application) 1812 and/or a payment manager 1814. The payment server 1820, for example, may include a payment service server 1822 and/or a token requester (for example, a token requester server) 1824.

According to various embodiments of the present disclosure, the payment application 1812 may include an application such as Samsung Pay™ Application. The payment application 1812, for example, may provide a payment related user interface (for example, user interface (UI) or user experience (UX)). The payment related UI may include wallet UI/UX. For example, the payment application 1812 may provide a UI relating to card registration, payment, or transaction. For example, the payment application 1812 may provide an interface relating to a character reader (for example, an optical character reader/recognition (OCR)) or an external input (for example, a user input). Additionally, the payment application 1812, for example, may provide a user authentication related interface through identification and verification (ID&V).

According to various embodiments of the present disclosure, the payment application 1812 may perform payment transaction through the payment application 1812. For example, the payment application 1812 may provide a payment function to a user through Simple Pay, Quick Pay, or specified application execution. A user may perform a payment function by using the payment application 1812 and receive information relating to the payment function.

According to various embodiments of the present disclosure, the payment manager 1814 may include card company related information. For example, the payment manager 1814 may include a card company software development kit (SDK).

According to various embodiments of the present disclosure, the payment server 1820 may include a management server for electronic payment or mobile payment. The payment server 1820, for example, may receive payment related information from the electronic device 1810 and transmit it to the outside or process it in the payment server 1820.

According to various embodiments of the present disclosure, the payment server 1820 may transmit/receive information between the electronic device 1810 and the token server 1830 by using the payment service server 1822 and/or the token requester server 1824. The payment service server 1822 may include a payment server such as a Samsung payment server. The payment service server 1822, for example, may manage card information linked to a service account (for example, Samsung account) or a user account. Additionally, the payment service server 1822 may include an API server relating to the payment application 1812. Additionally, the payment service server 1822, for example, may provide the payment management module (for example, account integration or Samsung account integration).

According to various embodiments of the present disclosure, the token requester server 1824 may provide an interface for processing payment related information. For example, the token requester server 1824 may perform the issue, deletion, or activation of payment related information (for example, a token). Alternatively, it may be functionally connected to the payment manager 1814 and control information necessary for the payment.

According to various embodiments of the present disclosure, the payment application 1812 in the electronic device 1810 may be functionally connected to the payment service server 1822 in the payment server 1820. For example, the payment application 1812 may transmit/receive payment related information to/from the payment server 1820. According to an embodiment of the present disclosure, the payment manager 1814 in the electronic device 1810 may be functionally connected to the token requester server 1824 in the payment server 1820. For example, the payment manager 1814 may transmit/receive payment related information to/from the token requester server 1824.

According to various embodiments of the present disclosure, the token server 1830 may issue payment related information (for example, a token) or manage payment related information. For example, the token server 1830 may control the life cycle of a token and the life cycle may include a generation, modification, or deletion function. Additionally, the token server 1830 may include a token management server and may perform token provisioning, identification and verification (ID&V), replenishment, or life cycle management. Additionally, the token server 1830 may perform the integration of financial server related information.

According to various embodiments of the present disclosure, the payment server 1820 and/or the token server 1830 may be located in the same or similar area or located in separated areas. For example, the payment manager 1820 may be included in a first server and the token server 1830 may be included in a second server. Additionally, for example, the payment manager 1820 and/or the token server 1830 may be separately implemented in one server (for example, a first server or a second server).

According to various embodiments of the present disclosure, the financial server 1840 may perform card issue. For example, the financial server 1840 may include a card issue bank. Additionally, the financial server 1840 may generate information necessary for payment provided to a user. The user may store the information necessary for payment, which is generated from the financial server 1840, in the electronic device 1810 by using the payment application 1812. Additionally, the financial server 1840 may be functionally connected to the token server 1830 and transmit/receive the information necessary for payment to/from it.

Figure 19:
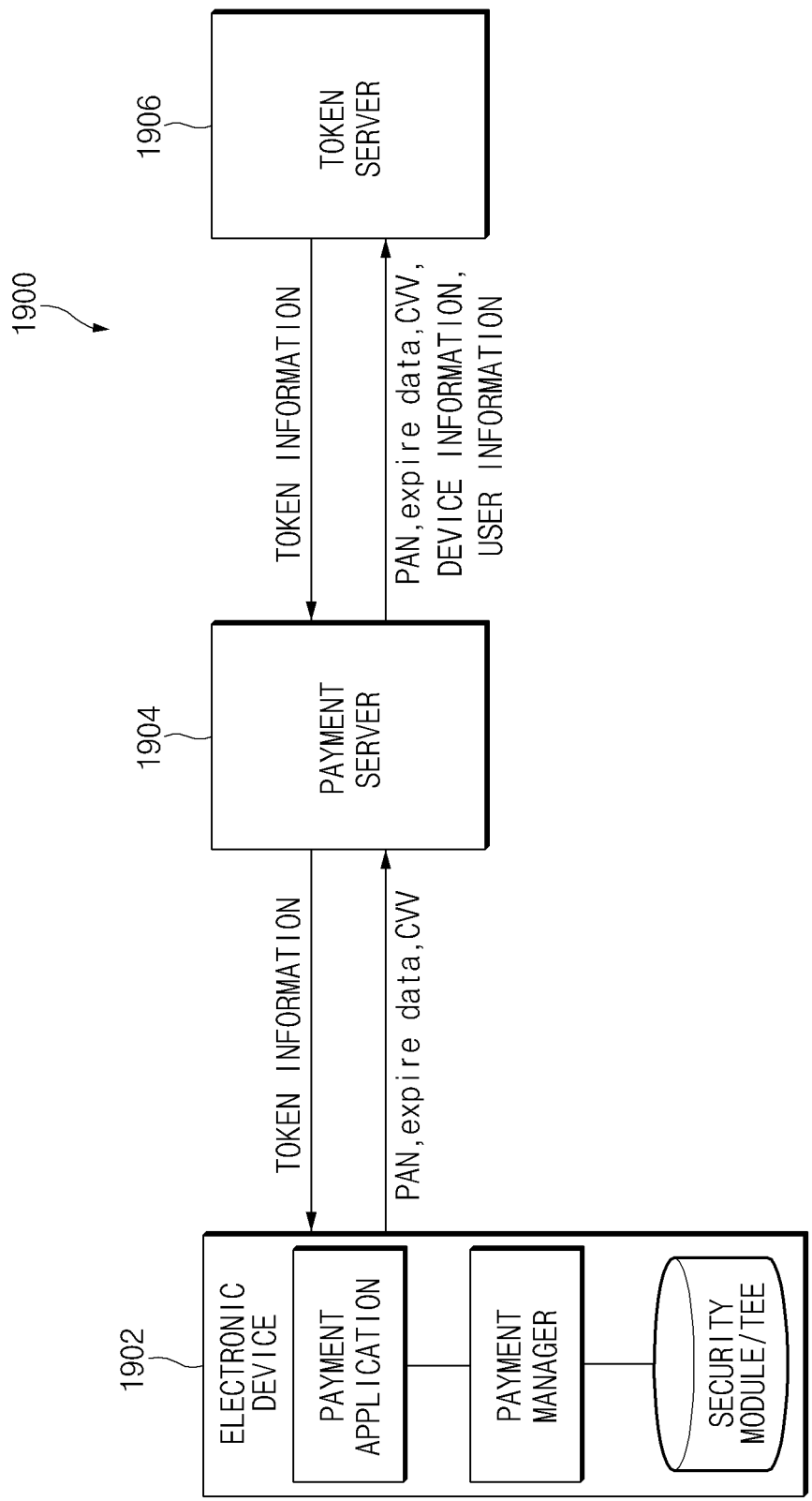
FIG. 19 is a view illustrating an operation for issuing payment identification information according to an embodiment of the present disclosure.

FIG. 19 is a view illustrating a payment identification information issue operation according to an embodiment of the present disclosure.

Referring to FIG. 19, the payment identification information issue operation, for example, may include an electronic device 1902 (for example, the electronic device 100), a payment server 1904 (for example, the management server 300), or a token server 1906. The electronic device 1902, for example, may include at least one of a payment application, a payment manager, a security module, and TEE.

According to various embodiments of the present disclosure, the electronic device 1902 may obtain card related information through a sensor functionally connected to the electronic device 1902. The card related information, for example, may be used for a card registration operation. The sensor, for example, may include OCR. The card related information, for example, may include at least one of a PAN, an expiration period, and a card verification value (CVV). The sensor, for example, may be performed by using the payment application included in the electronic device 1902.

According to various embodiments of the present disclosure, the payment application included in the electronic device 1902 may deliver the card related information to the payment server 1904. The payment server 1904, for example, may include a payment service server or a token requester server, and the card related information may be delivered between the payment service server and the token requester server.

According to an embodiment of the present disclosure, the payment server 1904 (for example, the token requester server) may deliver, to the token server 1906, the card related information and/or information relating to the electronic device 1902 (for example, device information or user information). The information relating to the electronic device 1902, for example, may include a device for requesting the payment identification information issue operation.

According to an embodiment of the present disclosure, the token server 1906 may issue (or generate) payment identification information (for example, a token) based on information received from the payment server 1904.

According to an embodiment of the present disclosure, the token server 1906 may deliver payment identification information based on information received from the payment server 1904. The token server 1906, for example, may deliver the payment identification information to the token requester server included in the payment server 1904.

According to an embodiment of the present disclosure, the payment server 1904 may deliver the payment identification information to the electronic device 1902. The payment server 1904, for example, may deliver the payment identification information from the token requester server included in the payment server 1904 to the electronic device 1902.

According to an embodiment of the present disclosure, the electronic device 1902 may store the payment identification information received from the payment server 1904 in the security module or the TEE. For example, the electronic device 1902 may store the payment identification information in the security module or the TEE, that is, a security area, so that it may control an access from the outside.

According to an embodiment of the present disclosure, the electronic device 1902 may store the payment identification information received from the payment server 1904 in the general memory (for example, a memory in REE).

According to an embodiment of the present disclosure, in relation to the payment identification information, at least one payment identification information may be issued (or generated) based on a payment method (for example, OTP or call center) performed in the electronic device 1902.

According to an embodiment of the present disclosure, in relation to the payment identification information, one payment identification information may be issued (or generated) in correspondence to the electronic device 1902. For example, first payment identification information may be included in a first electronic device and second payment identification information may be included in a second electronic device. The first and second payment identification information may be different from each other.

According to an embodiment of the present disclosure, the payment identification information may be activated based on an authentication operation (for example, ID&V). For example, the payment identification information may be stored in the electronic device 1902 and may be activated based on the authentication operation. The authentication operation, for example, may include identification check. The identification check, for example, may be performed through a financial server.

According to various embodiments of the present disclosure, the payment identification information (for example, a token) issue operation may be changed based on country. For example, the payment identification information issue operation may be changed based on the United States, Europe, or Korea.

Figure 20:
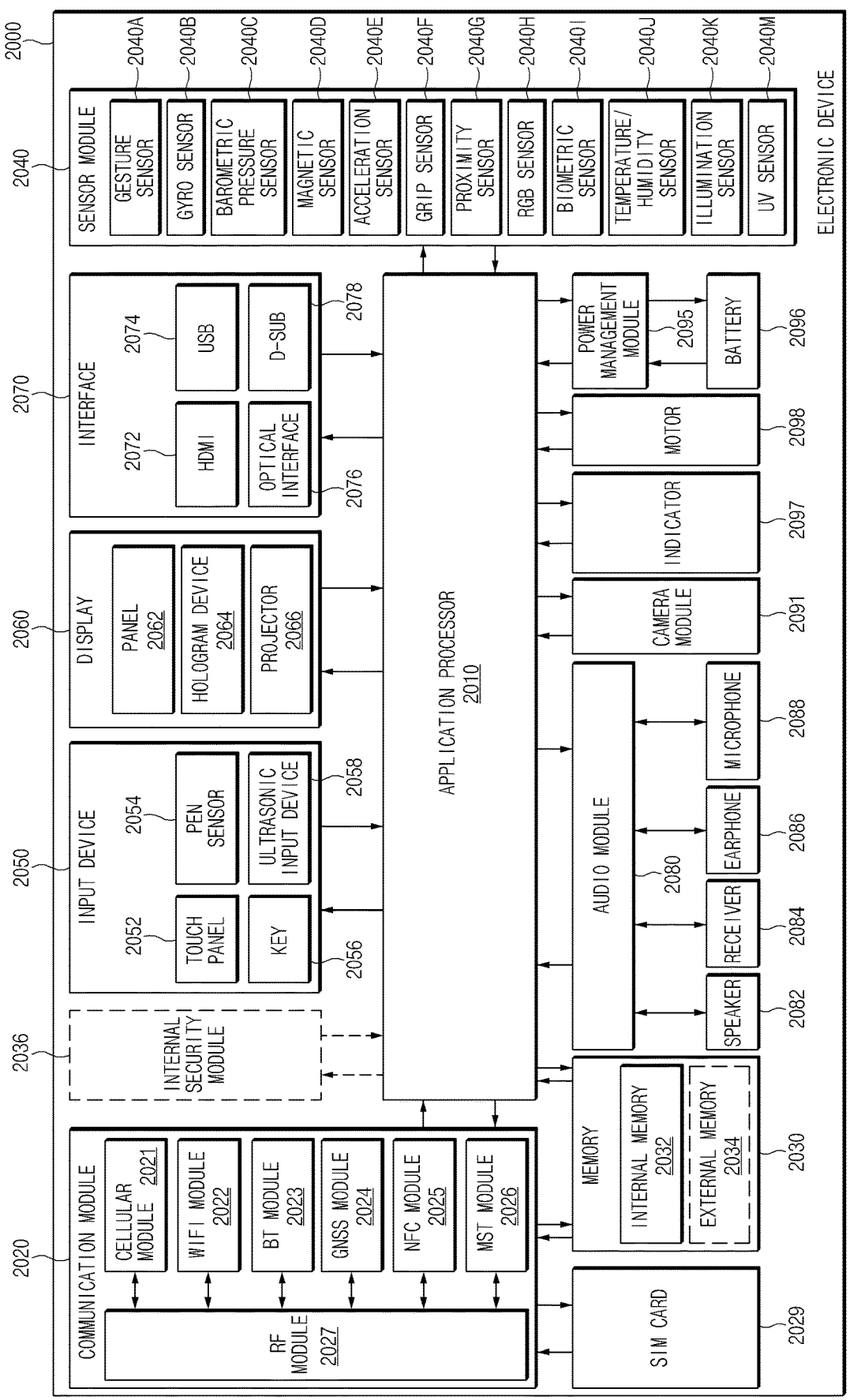
FIG. 20 is a block diagram illustrating an electronic device according to various embodiments of the present disclosure.

FIG. 20 is a block diagram illustrating an electronic device according to various embodiments of the present disclosure.

Referring to FIG. 20, the electronic device 2000 may include all or part of the electronic device 100 shown in FIG. 2. The electronic device 2000 may include at least one processor (for example, an AP) 2010, a communication module 2020, a security module 2036, a SIM 2029, a memory 2030, a sensor module 2040, an input device 2050, a display 2060, an interface 2070, an audio module 2080, a camera module 2091, a power management module 2095, a battery 2096, an indicator 2097, and a motor 2098.

The processor 2010 may control a plurality of hardware or software components connected thereto and also may perform various data processing and operations by executing an operating system or an application program. The processor 2010 may be implemented with a system on chip (SoC), for example. According to an embodiment of the present disclosure, the processor 2010 may further include a graphic processing unit (GPU) (not shown) and/or an image signal processor. The processor 2010 may include at least part (for example, a cellular module 2021) of components shown in FIG. 20. The processor 2010 may load commands or data received from at least one of other components (for example, nonvolatile memory) and process them and may store various data in a nonvolatile memory.

The communication module 2020 may have the same or similar configuration to the communication interface 170 of FIG. 2. The communication module 2020 may include the cellular module 2021, a Wi-Fi module 2022, a BT module 2023, a GNSS module 2024 (for example, a GPS module, a Glonass module, a Beidou module, or a Galileo module), an NFC module 2025, an MST module 2026, and a radio frequency (RF) module 2027.

The cellular module 2021, for example, may provide voice call, video call, text service, or internet service through communication network. According to an embodiment of the present disclosure, the cellular module 2021 may perform a distinction and authentication operation on the electronic device 2000 in a communication network by using a SIM (for example, a SIM card) 2029. According to an embodiment of the present disclosure, the cellular module 2021 may perform at least part of a function that the processor 2010 provides. According to an embodiment of the present disclosure, the cellular module 2021 may include a communication processor (CP).

Each of the Wi-Fi module 2022, the BT module 2023, the GNSS module 2024, the NFC module 2025, and the MST module 2026 may include a processor for processing data transmitted/received through a corresponding module. According to an embodiment of the present disclosure, at least part (for example, at least one) of the cellular module 2021, the Wi-Fi module 2022, the BT module 2023, the GNSS module 2024, the NFC module 2025, and the MST module 2026 may be included in one integrated chip (IC) or IC package.

The RF module 2027, for example, may transmit/receive communication signals (for example, RF signals). The RF module 2027, for example, may include a transceiver, a power amp module (PAM), a frequency filter, a low noise amplifier (LNA), or an antenna. According to another embodiment of the present disclosure, at least one of the cellular module 2021, the Wi-Fi module 2022, the BT module 2023, the GNSS module 2024, the NFC module 2025, and the MST module 2026 may transmit/receive RF signals through a separate RF module.

The SIM 2029, for example, may include a card including a SIM and/or an embedded SIM and also may include unique identification information (for example, an integrated circuit card identifier (ICCID)) or subscriber information (for example, an international mobile subscriber identity (IMSI)).

The memory 2030 (for example, the first memory 130) may include an internal memory 2032 or an external memory 2034. The internal memory 2032 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash or NOR flash), hard drive, and solid state drive (SSD)).

The external memory 2034 may further include flash drive, for example, compact flash (CF), secure digital (SD), micro Micro-SD, Mini-SD, extreme digital (xD), multi media card (MMC) or a memorystick. The external memory 2034 may be functionally and/or physically connected to the electronic device 2000 through various interfaces.

The security module 2036, as a module having a relatively higher security level than the memory 2030, may be a circuit for securing safe data storage and protected execution environment. The security module 2036 may be implemented as a separate circuit and may include an additional processor. The security module 2036, for example, may be in a detachable smart chip or a SD card or may include an eSE embedded in a fixed chip of the electronic device 2000. Additionally, the security module 2036 may run on a different OS from the electronic device 2000. For example, it may run based on java card open platform (JCOP) OS.

The sensor module 2040 measures physical quantities or detects an operating state of the electronic device 2000, thereby converting the measured or detected information into electrical signals. The sensor module 2040 may include at least one of a gesture sensor 2040A, a gyro sensor 2040B, a barometric pressure sensor 2040C, a magnetic sensor 2040D, an acceleration sensor 2040E, a grip sensor 2040F, a proximity sensor 2040G, a color sensor 2040H (for example, a red, green, blue (RGB) sensor), a biometric sensor 2040I, a temperature/humidity sensor 2040J, an illumination sensor 2040K, and an ultra violet (UV) sensor 2040M. Additionally or alternatively, the sensor module 2040 may include an E-nose sensor, an electromyography (EMG) sensor, an electroencephalogram (EEG) sensor, an electrocardiogram (ECG) sensor, an infra-red (IR) sensor, an iris sensor, and/or a fingerprint sensor. The sensor module 2040 may further include a control circuit for controlling at least one sensor therein. According to an embodiment of the present disclosure, the electronic device 2000 may further include a processor configured to control the sensor module 2040 as part of or separately from the processor 2010 and thus may control the sensor module 2040 while the processor 2010 is in a sleep state.

The input device 2050 may include a touch panel 2052, a (digital) pen sensor 2054, a key 2056, or an ultrasonic input device 2058. The touch panel 2052 may use at least one of capacitive, resistive, infrared, or ultrasonic methods, for example. Additionally, the touch panel 2052 may further include a control circuit. The touch panel 2052 may further include a tactile layer to provide tactile response to a user.

The (digital) pen sensor 2054, for example, may include a sheet for recognition as part of a touch panel or a separate sheet for recognition. The key 2056 may include a physical button, an optical key, or a keypad, for example. The ultrasonic input device 2058 may detect ultrasonic waves generated from an input tool through a microphone (for example, a microphone 2088) in order to check data corresponding to the detected ultrasonic waves.

The display 2060 (for example, the first display 160) may include a panel 2062, a hologram device 2064, or a projector 2066. The panel 2062 may have the same or similar configuration to the first display 160 of FIG. 2. The panel 2062 may be implemented to be flexible, transparent, or wearable, for example. The panel 2062 and the touch panel 2052 may be configured with one module. The hologram device 2064 may show three-dimensional images in the air by using the interference of light. The projector 2066 may display an image by projecting light on a screen. The screen, for example, may be placed inside or outside the electronic device 2000. According to an embodiment of the present disclosure, the display 2060 may further include a control circuit for controlling the panel 2062, the hologram device 2064, or the projector 2066.

The interface 2070 may include a high-definition multimedia interface (HDMI) 2072, a universal serial bus (USB) 2074, an optical interface 2076, or a D-subminiature (sub) 2078 for example. The interface 2070, for example, may be included in the first communication interface 170 shown in FIG. 2. Additionally or alternatively, the interface 2070 may include a mobile high-definition link (MHL) interface, a secure Digital (SD) card/multi-media card (MMC) interface, or an infrared data association (IrDA) standard interface.

The audio module 2080 may convert sound into electrical signals and convert electrical signals into sounds. At least some components of the audio module 2080, for example, may be included in the input/output interface 150 shown in FIG. 2. The audio module 2080 may process sound information inputted/outputted through a speaker 2082, a receiver 2084, an earphone 2086, or the microphone 2088.

The camera module 2091, as a device for capturing a still image and a video, may include at least one image sensor (for example, a front sensor or a rear sensor), a lens, an image signal processor (ISP), or a flash (for example, an LED or a xenon lamp).

The power management module 2095 may manage the power of the electronic device 2000. According to an embodiment of the present disclosure, the power management module 2095 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 2096, or a voltage, current, or temperature thereof during charging. The battery 2096, for example, may include a rechargeable battery and/or a solar battery.

The indicator 2097 may display a specific state of the electronic device 2000 or part thereof (for example, the processor 2010), for example, a booting state, a message state, or a charging state. The motor 2098 may convert electrical signals into mechanical vibration and may generate vibration or haptic effect. Although not shown in the drawings, the electronic device 2000 may include a processing device (for example, a GPU) for mobile TV support. A processing device for mobile TV support may process media data according to the standards such as digital multimedia broadcasting (DMB), digital video broadcasting (DVB), or mediaFLO™.

Each of the above-mentioned components of the electronic device according to various embodiments of the present disclosure may be configured with at least one component and the name of a corresponding component may vary according to the kind of an electronic device. According to various embodiments of the present disclosure, an electronic device may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the first memory 130, for example.

Figure 21:
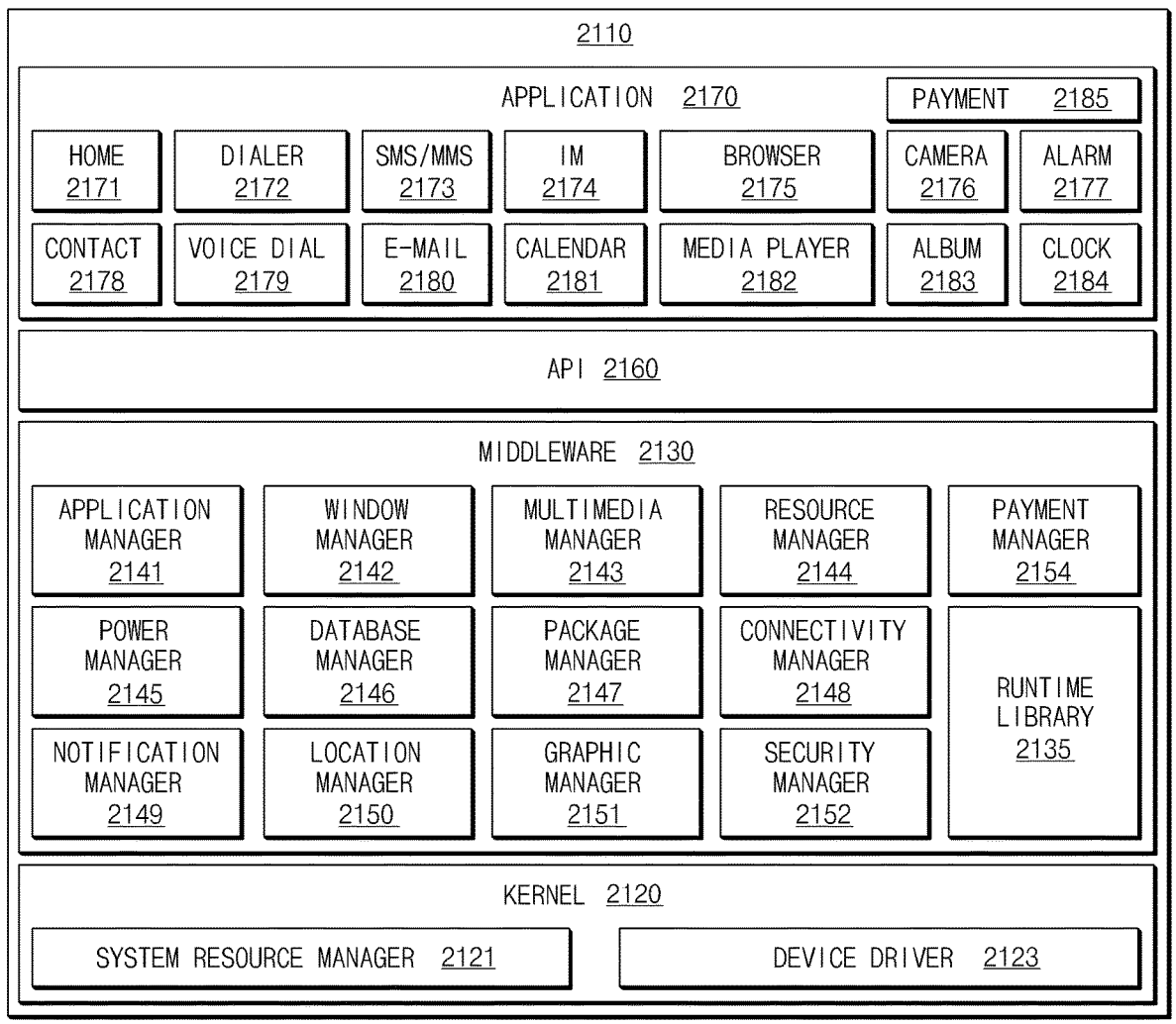
FIG. 21 is a block diagram illustrating a program module according to an embodiment of the present disclosure.

FIG. 21 is a block diagram illustrating a program module according to an embodiment of the present disclosure.

Referring to FIG. 21, according to various embodiments of the present disclosure, a program module 2110 (for example, the program 140) may include an OS for controlling a resource relating to an electronic device (for example, the electronic device 100) and/or various applications (for example, the application program 147) running on the OS. The OS, for example, may include android, iOS, windows, symbian, tizen, or bada.

The program module 2110 may include a kernel 2120, a middleware 2130, an API 2160, and/or an application program (or an application) 2170. At least part of the program module 2110 may be preloaded on an electronic device or may be downloaded from a server (for example, the electronic devices 102 and 104 and the server 106).

The kernel 2120 (for example, the kernel 141), for example, may include a system resource manager 2121, or a device driver 2123. The system resource manager 2121 may perform the control, allocation, or retrieval of a system resource. According to an embodiment of the disclosure, the system resource manager 2121 may include a process management unit, a memory management unit, or a file system management unit. The device driver 2123 may include, for example, a display driver, a camera driver, a Bluetooth driver, a sharing memory driver, a USB driver, a keypad driver, a Wi-Fi driver, an audio driver, or an inter-process communication (IPC) driver.

The middleware 2130, for example, may provide a function that the application 2170 requires commonly, or may provide various functions to the application 2170 through the API 1260 in order to allow the application 2170 to efficiently use a limited system resource inside the electronic device. According to an embodiment, the middleware 2130 (for example, the middleware 143) may include at least one of a runtime library 2135, an application manager 2141, a window manager 2142, a multimedia manager 2143, a resource manager 2144, a power manager 2145, a database manager 2146, a package manager 2147, a connectivity manager 2148, a notification manager 2149, a location manager 2150, a graphic manager 2151, a security manager 2152, and a payment manager 2154.

The runtime library 2135, for example, may include a library module that a complier uses to add a new function through a programming language while the application 2170 is running. The runtime library 2135 may perform a function on input/output management, memory management, or an arithmetic function.

The application manager 2141, for example, may mange the life cycle of at least one application among the applications 2170. The window manager 2142 may manage a GUI resource used in a screen. The multimedia manager 2143 may recognize a format for playing various media files and may encode or decode a media file by using the codec corresponding to a corresponding format. The resource manager 2144 may manage a resource such as a source code, a memory, or a storage space of at least any one of the applications 2170.

The power manager 2145, for example, may operate together with a basic input/output system (BIOS) to manage the battery or power and may provide power information necessary for an operation of the electronic device. The database manager 2146 may create, search, or modify a database used in at least one application among the applications 2170. The package manager 2147 may manage the installation or update of an application distributed in a package file format.

The connectivity manger 2148 may manage a wireless connection such as Wi-Fi or Bluetooth. The notification manager 2149 may display or notify an event such as arrival messages, appointments, and proximity alerts to a user in a manner of not interrupting the user. The location manager 2150 may manage location information on an electronic device. The graphic manager 2151 may manage a graphic effect to be provided to a user or a user interface relating thereto. The security manager 2152 may provide various security functions necessary for system security or user authentication. According to an embodiment of the present disclosure, when an electronic device (for example, the electronic device 100) includes a phone function, the middleware 2130 may further include a telephony manager for managing a voice or video call function of the electronic device. The payment manager 2154 may relay information for payment from the application 2170 to the application 2170 or the kernel 2120. Additionally, information relating to payment received from an external device may be stored in the electronic device or information stored therein may be delivered to an external device.

The middleware 2130 may include a middleware module for forming a combination of various functions of the above-mentioned components. The middleware 2130 may provide a module specialized for each type of OS to provide differentiated functions. Additionally, the middleware 2130 may delete part of existing components or add new components dynamically.

The API 2160 (for example, the API 145), for example, as a set of API programming functions, may be provided as another configuration according to OS. For example, in the case of android or iOS, one API set may be provided for each platform and in the case Tizen, at least two API sets may be provided for each platform.

The application 2170 (for example, the application program 147) may include at least one application for providing functions such as a home 2171, a dialer 2172, an SMS/MMS 2173, an instant message (IM) 2174, a browser 2175, a camera 2176, an alarm 2177, a contact 2178, a voice dial 2179, an e-mail 2180, a calendar 2181, a media player 2182, an album 2183, a clock 2184, a payment 2185, health care (for example, measure an exercise amount or blood sugar), or environmental information provision (for example, provide air pressure, humidity, or temperature information).

According to an embodiment of the present disclosure, the application 2170 may include an application (hereinafter referred to as "information exchange application" for convenience of description) for supporting information exchange between the electronic device (for example, the electronic device 100) and an external electronic device (for example, the electronic devices 102 and 104). The information exchange application, for example, may include a notification relay application for relaying specific information to the external device or a device management application for managing the external electronic device.

For example, the notification relay application may have a function for relaying to an external electronic device (for example, electronic devices 102 and 104) notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the electronic devices 102 and 104) communicating with the electronic device, an application operating in the external electronic device, or a service (for example, call service or message service) provided from the external device.

According to an embodiment of the disclosure, the application 2170 may include a specified application (for example, a health care application of a mobile medical device) according to the property of an external electronic device (for example, the electronic devices 102 and 104). According to an embodiment of the present disclosure, the application 2170 may include an application received from an external electronic device (for example, the server 106 or the electronic device 102 or 104). According to an embodiment of the disclosure, the application 2170 may include a preloaded application or a third party application downloadable from a server. The names of components in the program module 2110 according to the shown embodiment may vary depending on the type of OS.

According to various embodiments of the present disclosure, at least part of the program module 2110 may be implemented with software, firmware, hardware, or a combination thereof. At least part of the programming module 2110, for example, may be implemented (for example, executed) by a processor (for example, the processor 120). At least part of the programming module 2110 may include a module, a program, a routine, sets of instructions, or a process to perform at least one function, for example.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 120) executes an instruction, it may perform a function corresponding to the instruction. The non-transitory computer-readable storage media may include the memory 130, for example.

The non-transitory computer-readable storage media may include hard disks, floppy disks, magnetic media (for example, magnetic tape), optical media (for example, compact disc read only memory (CD-ROM), and digital versatile disc (DVD)), magneto-optical media (for example, floptical disk), and hardware devices (for example, read only memory (ROM), random access memory (RAM), or flash memory). Additionally, a program instruction may include high-level language code executable by a computer using an interpreter in addition to machine code created by a complier. The hardware device may be configured to operate as at least one software module to perform an operation of various embodiments and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added. Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

Figure 22:
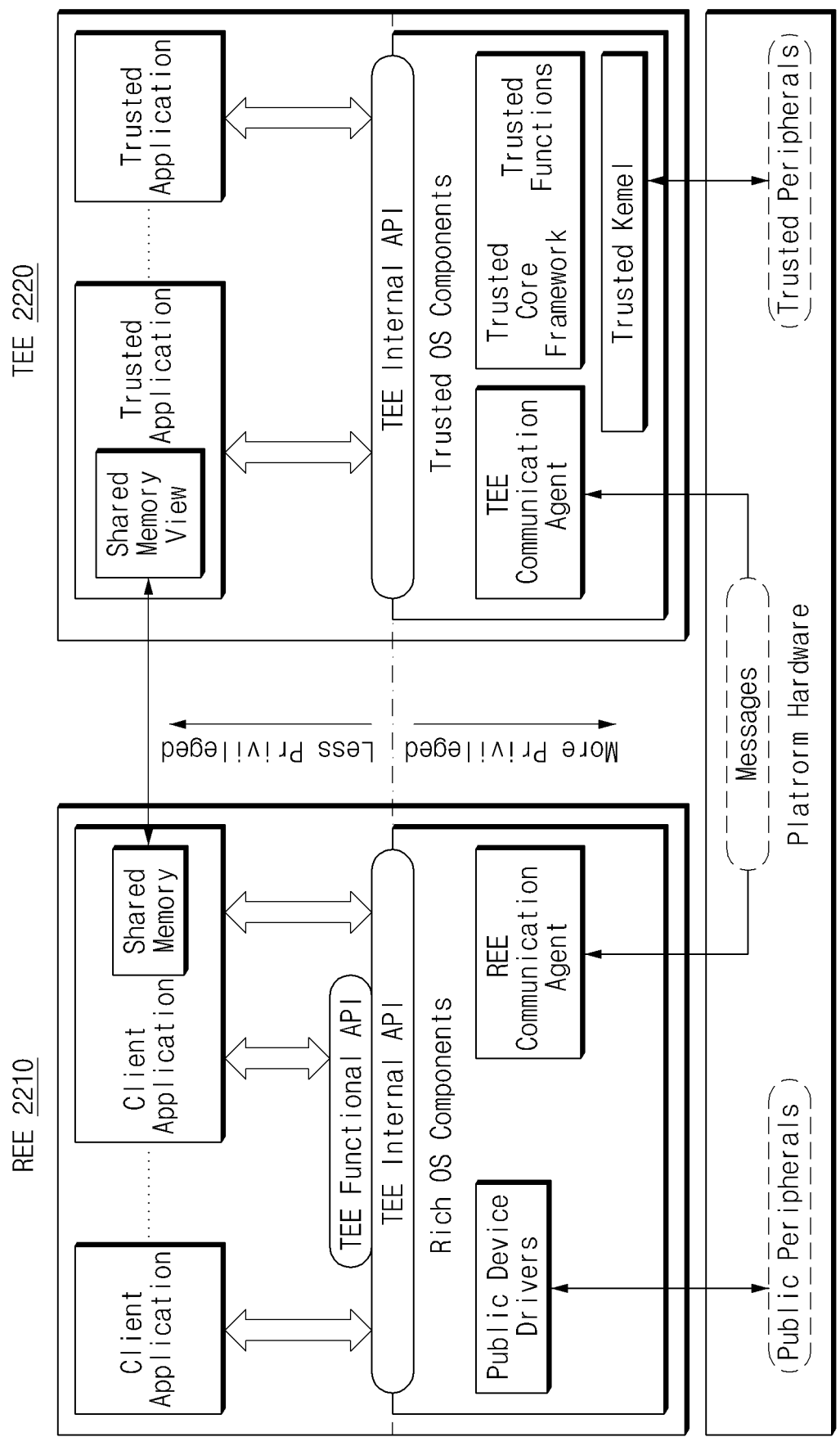
FIG. 22 is a block diagram illustrating a rich execution environment (REE) and a trusted execution environment (TEE) operating in an electronic device according to various embodiments of the present disclosure.

FIG. 22 is a block diagram illustrating a rich execution environment (REE) and a trusted execution environment (TEE) operating in an electronic device (for example, the electronic device 100) according to various embodiments of the present disclosure.

Referring to FIG. 22, according to various embodiments of the present disclosure, an electronic device may operate an execution environment having a plurality of security levels for security enhancement. The plurality of execution environments, for example, may include an REE 2210 and a TEE 2220. The REE 2210, for example, may be a first execution environment having a first security level. The TEE 2220, for example, may be a second execution environment having a second security level different from (for example, higher than) the first security level. According to an embodiment of the present disclosure, the electronic device 100 may include an additional another execution environment (for example, a third execution environment) having a third security level and the present disclosure is not limited thereto.

The TEE 2220 may store data, which requires a relatively high security level, in a safe environment and perform a related operation. The TEE 2220 may operate on an application processor of an electronic device and operate based on a reliable hardware structure determined during a manufacturing process. The TEE 2220 may divide an application processor or a memory into a general area and a security area and operate in the security area. The TEE 2220 may set software or hardware, which requires security, to operate only in a security area. The electronic device may operate the TEE 2220 through a physical change of hardware or a logical change of software.

The TEE 2220 may be separated from the REE 2210 through hardware restriction or may be separated from the REE 2210 in the same hardware in terms of software and operate. At least one application (for example, payment, contact, e-mail or browser) operating in the REE 2210 may use an API (for example, TEE functional API or TEE client API) allowed to access the TEE 2220. The at least one application may deliver a message to a communication agent (for example, a TEE communication agent) of the TEE 2220 from a communication agent (for example, an REE communication agent) of the REE 2210 by using the API. The message may be implemented to be delivered to only the TEE 2220. The communication agent of the TEE 2220 may receive the message and deliver it to a trusted application (TA) (for example, DRM, a security payment module, or a security bio information module) relating to the message. The TA may perform an operation relating to the message and deliver a result on the operation to the communication agent of the REE 2210 through the communication agent of the TEE 2220. The communication agent of the REE 2210 may deliver the result to at least one application operating in the REE 2210.

Figure 23A:
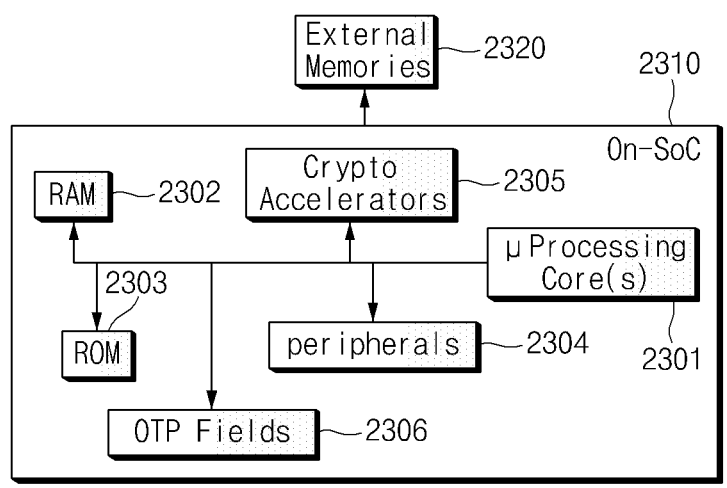
FIGS. 23A to 23C are block diagrams illustrating a hardware structure of a TEE according to various embodiments of the present disclosure.
Figure 23B:
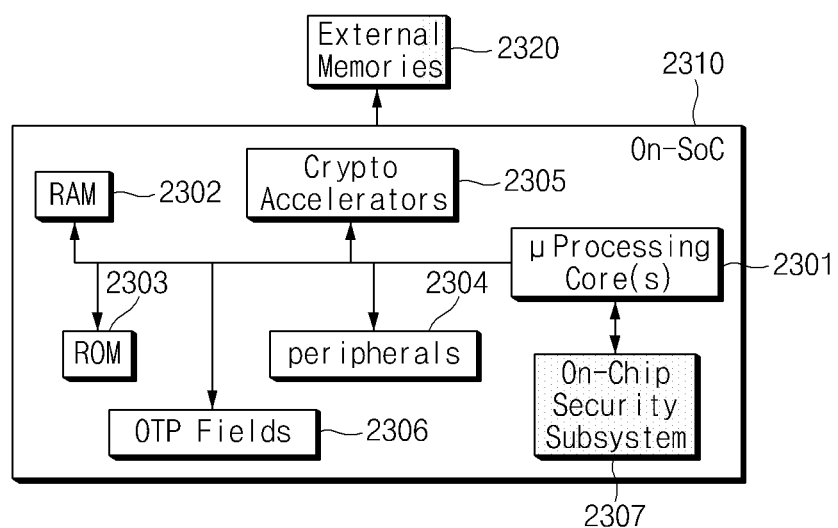
Figure 23C:
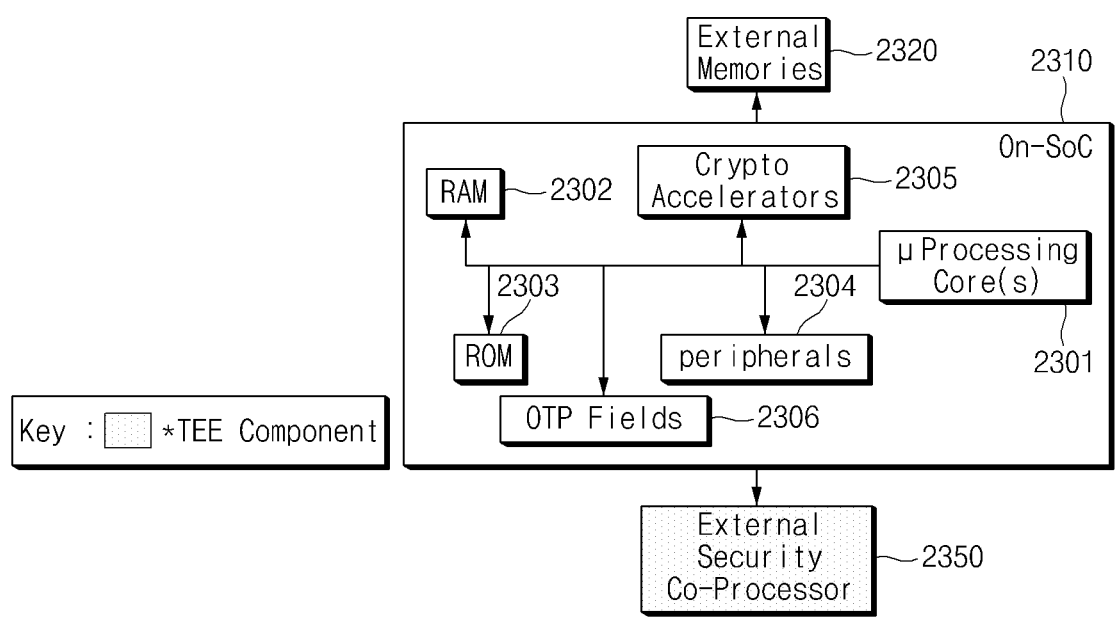

FIGS. 23A to 23C are block diagrams illustrating a hardware structure of a TEE according to various embodiments of the present disclosure.

FIG. 23A illustrates a case (for example, a Trustzone (TZ) of ARM) that one processor and one memory are divided into an REE and a TEE in terms of hardware and used. According to an embodiment of the present disclosure, a hardware structure of the TEE may include an On-SoC 2310 and external memories 2320. The On-SoC 2310 may include a micro processing core 2301, a RAM 2302, a ROM 2303, a peripheral 2304, a crypto accelerator 2305, or OTP fields 2306. The TZ may distinguish the REE from the TEE and use them by dividing a processor temporally in order to operate two or more execution environments. Additionally, the TZ may divide one memory into an area accessible from the REE and an area accessible from the TEE and use them.

FIG. 23B illustrates a case that a processor for TEE is implemented in an on-chip form like a processor for operating an REE but implemented with an additional processing core set. According to an embodiment of the present disclosure, an On-SoC 2310 may additionally include an On-chip security subsystem 2307 including at least one processor in addition to a micro processing core 2301. In such a case, the On-SoC 2310 may be set to operate an REE and the On-chip security subsystem 2307 may be set to operate a TEE. In the case of FIG. 23B, like FIG. 22A, one memory may be divided into an area accessible from the REE and an area accessible from the TEE and use them.

FIG. 23C illustrates a case that a processor for TEE is implemented with an additional chip in terms of hardware, so that it is separated from a chip in which a processor for operating an REE is implemented.

Referring to FIG. 23C, the On-Soc 2310 may be set to operate the REE and at least one external security co-processor 2350 equipped outside the On-Soc 2310 may be set to operate the TEE.

According to various embodiments of the present disclosure, a storage medium may store a computer readable instruction and the computer readable instruction may be set to perform receiving an application identifier for payment transaction from a reader device, generating payment information including payment identification information for payment transaction and additional service information relating to the payment transaction by a payment application according to the application identifier, and transmitting the payment related information to the reader device. Besides that, instructions for performing the above-mentioned various methods may be further stored in the storage medium.

According to various embodiments of the present disclosure, payment information processing and specified additional service information processing may be performed automatically at the same time. Accordingly, according to various embodiments of the present disclosure, faster and simpler additional service information processing may be supported.

Additionally, according to various embodiments of the present disclosure, additional service information processing and payment information processing are substantially processed at the same time (or at the same time from a user's view), so that repetitive information processing operations may become simpler.

Besides that, various effects derived through the specification may be provided.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile electronic device comprising:
a communication circuit;
a memory configured to store at least one instruction and an application for a payment transaction; and
a processor operatively connected to the memory and the communication circuit,
wherein the at least one instruction executed by the processor is set to:

receive a user input to execute an application installed in the mobile electronic device for the payment transaction, execute the application for the payment transaction based on the user input and authentication of the user and activate the communication circuit in response to the user input and the authentication of the user, receive an application identifier for the payment transaction from a reader device through the communication circuit, when the application identifier corresponds to a specific payment application, deliver, by the mobile electronic device, a specific additional service information and payment identification information relating to the payment transaction to the reader device, receive a processing result of the specific additional service information from a management server, and display the processing result on a display, when the application identifier does not correspond to the specific payment application, make payment, by the mobile electronic device, based on another payment processing method, generate payment related information including the payment identification information for the payment transaction based on the application identifier and a specific additional service information relating to the payment transaction stored in the memory of the mobile electronic device, and provide the generated payment related information to the reader device.

2. The mobile electronic device of claim 1, wherein the at least one instruction executed by the processor, is further set to automatically write additional service code information corresponding to additional service information included in an additional list to the payment related information corresponding to reception of the additional list including at least one additional service information that is operable in relation to the payment transaction.

3. The mobile electronic device of claim 1, wherein the at least one instruction executed by the processor is further set to:

output a screen for selecting the additional service information while the payment transaction is performed, and write code information corresponding to the selected additional service information in the payment related information.

4. The mobile electronic device of claim 1, wherein the at least one instruction executed by the processor is further set to dispose the additional service information on at least one of a front end, a read end, and a middle end of a packet corresponding to the payment identification information.

5. The mobile electronic device of claim 1, wherein the at least one instruction executed by the processor is further set to include at least one of membership card information, discount card information, coupon information, or advertisement information, which relate to the payment transaction, in the additional service information.

6. The mobile electronic device of claim 1, wherein the at least one instruction executed by the processor is further set to store a received payment identification information.

7. The mobile electronic device of claim 1, wherein the at least one instruction executed by the processor is further set to transmit the payment related information through a near field communication (NFC) communication method.

8. The mobile electronic device of claim 1, wherein the at least one instruction executed by the processor is further set to receive at least one of a processing result of the payment transaction or a processing result of the additional service information from an external server.

9. The mobile electronic device of claim 8, wherein the at least one instruction executed by the processor is further set to display or store at least one of the received processing result of the payment transaction or the received processing result of the additional service information.

10. A payment additional service information processing method comprising:

receiving, by a mobile electronic device, a user input to execute an application installed in the mobile electronic device for a payment transaction;

executing, by the mobile electronic device, the application based on the user input and authentication of the user and activate a communication circuit in response to the user input and the authentication of the user;

receiving, by the mobile electronic device, an application identifier for the payment transaction from a reader device through the communication circuit of the mobile electronic device;

when the application identifier corresponds to a specific payment application, delivering, by the mobile electronic device, a specific additional service information and payment identification information relating to the payment transaction to the reader device, receiving a processing result of the specific additional service information from a management server, and displaying the processing result on a display;

when the application identifier does not correspond to the specific payment application, making payment, by the mobile electronic device, based on another payment processing method;

generating, by the mobile electronic device, payment related information including the payment identification information for the payment transaction based on the application identifier and a specific additional service information relating to the payment transaction stored in a memory of the mobile electronic device; and providing the payment related information to the reader device.

11. The method of claim 10, further comprising:

receiving, by the mobile electronic device, an additional list including at least one additional service information that is operable in relation to the payment transaction; and automatically writing, by the mobile electronic device, additional service code information corresponding to additional service information included in the additional list in the payment related information.

12. The method of claim 10 further comprising:

outputting, by the mobile electronic device, a screen for selecting the additional service information when the payment transaction is performed; and writing, by the mobile electronic device, code information corresponding to the selected additional service information in the payment related information.

13. The method of claim 10, wherein the generating, by the mobile electronic device, payment related information further comprises disposing, by the mobile electronic device, the additional service information on at least one of a front end, a read end, or a middle end of a packet corresponding to the payment identification information.

14. The method of claim 10, wherein the generating, by the mobile electronic device, payment related information further comprises including, by the mobile electronic device, at least one of membership card information, discount card information, coupon information, or advertisement information, which relate to the payment transaction, in the additional service information.

15. The method of claim 10, further comprising:
   storing, by the mobile electronic device, a received payment identification information.

16. The method of claim 10, wherein the providing of the payment related information to the reader device comprises transmitting, by the mobile electronic device, the payment related information through a near field communication (NFC) communication method.

17. The method of claim 10, further comprising receiving, by the mobile electronic device, at least one of a processing result of the payment transaction or a processing result of the additional service information.

18. The method of claim 17, further comprising displaying or storing, by the mobile electronic device, at least one of the received processing result of the payment transaction or the received processing result of the additional service information.

19. A storage medium configured to store a computer readable instruction, wherein the computer readable instruction, when executed by a processor of a mobile electronic device, is set to perform:
   receiving, by the mobile electronic device, a user input to execute an application installed in the mobile electronic device for a payment transaction;
   executing, by the mobile electronic device, the application based on the user input and authentication of the user and activate a communication circuit in response to the user input and the authentication of the user;
   receiving, by the mobile electronic device, an application identifier for the payment transaction from a reader device through the communication circuit of the mobile electronic device;
   when the application identifier corresponds to a specific payment application, delivering, by the mobile electronic device, a specific additional service information and payment identification information relating to the payment transaction to the reader device, receiving a processing result of the specific additional service information from a management server, and displaying the processing result on a display;
   when the application identifier does not correspond to the specific payment application, making payment, by the mobile electronic device, based on another payment processing method;
   generating, by the mobile electronic device, payment related information including the payment identification information for the payment transaction based on the application identifier and a specific additional service information relating to the payment transaction stored in a memory of the mobile electronic device; and
   providing the payment related information to the reader device.

* * * * *